US012566535B1

(12) United States Patent
Chen et al.

(10) Patent No.: US 12,566,535 B1
(45) Date of Patent: *Mar. 3, 2026

(54) PREVIEW ASSIGNED ROUTES

(71) Applicant: Samsara Inc., San Francisco, CA (US)

(72) Inventors: Xin Chen, New York, NY (US); Noah Ray, Philadelphia, PA (US); Tirso Peguero, San Francisco, CA (US); Sean McGee, Woodstock, GA (US); Emily White, San Francisco, CA (US); Helen Chung, Great Falls, VA (US)

(73) Assignee: Samsara Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/798,209

(22) Filed: Aug. 8, 2024

Related U.S. Application Data

(63) Continuation of application No. 17/811,152, filed on Jul. 7, 2022, now Pat. No. 12,093,508.

(60) Provisional application No. 63/365,804, filed on Jun. 3, 2022.

(51) Int. Cl.
| | |
|---|---|
| *G06F 3/0482* | (2013.01) |
| *G01C 21/34* | (2006.01) |
| *G06F 3/04847* | (2022.01) |
| *G06F 16/29* | (2019.01) |

(52) U.S. Cl.
CPC ........ *G06F 3/0482* (2013.01); *G06F 3/04847* (2013.01); *G06F 16/29* (2019.01); *G01C 21/3484* (2013.01)

(58) Field of Classification Search
CPC .... G06F 3/0482; G06F 3/04847; G06F 16/29; G01C 21/3484
See application file for complete search history.

(56) References Cited

U.S. PATENT DOCUMENTS

| | | | | |
|---|---|---|---|---|
| 5,808,565 A * | 9/1998 | Matta | ..................... | G08G 1/123 |
| | | | | 701/487 |
| 8,285,611 B2 * | 10/2012 | Fuller | .................... | G06Q 30/04 |
| | | | | 705/34 |
| 11,663,556 B1 * | 5/2023 | Jyoti | .................. | G06Q 10/0838 |
| | | | | 705/7.34 |

(Continued)

OTHER PUBLICATIONS

"U.S. Appl. No. 17/811,152, Non Final Office Action mailed Feb. 15, 2023", 31 pgs.

(Continued)

*Primary Examiner* — John T Repsher, III
(74) *Attorney, Agent, or Firm* — Schwegman Lundberg & Woessner, P.A.

(57) ABSTRACT

Disclosed are systems, methods, and non-transitory computer-readable media for previewing assigned routes. A route management system provides for accessing a route tracking report associated with a vehicle to identify a plurality of routes associated with the vehicle; generating, for display, a graphical user interface (GUI) for navigating through the plurality of routes associated with the vehicle, the graphical user interface comprising a plurality of time period options; receiving input that selects a first time period option from the plurality of time period options; in response to receiving the input, retrieving a first set of routes from the plurality of routes that corresponds to the first time period option; and updating the GUI to display a first portion of the first set of routes in response to receiving the input.

20 Claims, 9 Drawing Sheets

(56)                References Cited

U.S. PATENT DOCUMENTS

| 2013/0122867 | A1  | 5/2013  | Bayliss et al.               |
|--------------|-----|---------|------------------------------|
| 2013/0184035 | A1* | 7/2013  | Roberts, Sr. ........... G06Q 10/08 |
|              |     |         | 455/566                      |
| 2014/0026088 | A1* | 1/2014  | Monte ................... G06F 3/0488 |
|              |     |         | 715/765                      |
| 2017/0109704 | A1* | 4/2017  | Lettieri ................. G06Q 10/30 |
| 2017/0316378 | A1* | 11/2017 | Melton ............. G06Q 10/0838 |
| 2021/0065114 | A1* | 3/2021  | Thompson ......... G06Q 10/1093 |
| 2021/0166305 | A1  | 6/2021  | Tateishi et al.              |
| 2021/0270617 | A1* | 9/2021  | Spielman ............. H04W 4/021 |
| 2022/0004942 | A1  | 1/2022  | Gupta et al.                 |
| 2022/0018674 | A1  | 1/2022  | Xu et al.                    |
| 2023/0186226 | A1* | 6/2023  | Ceniti ............... G06Q 10/0838 |
|              |     |         | 705/330                      |
| 2023/0260067 | A1* | 8/2023  | Payette ................. G06Q 50/26 |
|              |     |         | 705/325                      |

OTHER PUBLICATIONS

"U.S. Appl. No. 17/811,152, Response filed Apr. 28, 2023 to Non Final Office Action mailed Feb. 15, 2023", 9 pgs.

"U.S. Appl. No. 17/811,152, Final Office Action mailed May 23, 2023", 35 pgs.

"U.S. Appl. No. 17/811,152, Response filed Aug. 8, 2023 to Final Office Action mailed May 23, 2023", 11 pgs.

"U.S. Appl. No. 17/811,152, Non Final Office Action mailed Jan. 30, 2024", 43 pgs.

"Compliance Product Brief", Motive Technologies Inc, (2022), 4 pgs.

"Dispatch Product Brief", Motive Technologies, Inc., (2022), 4 pgs.

"Driver Safety Product Brief", Motive Technologies Inc, (2022), 4 pgs.

"Product Brief Tracking and Telematics", Motive Technologies Inc, (2022), 4 pgs.

"Smart Event Thresholds Guide", Motive Technologies Inc, (2022), 11 pgs.

"U.S. Appl. No. 17/811,152, Response filed Apr. 17, 2024 to Non Final Office Action mailed Jan. 30, 2024", 12 pgs.

"U.S. Appl. No. 17/811,152, Examiner Interview Summary mailed Apr. 19, 2024", 2 pgs.

"U.S. Appl. No. 17/811,152, Notice of Allowance mailed Jun. 7, 2024", 13 pgs.

U.S. Appl. No. 17/811,152, filed Jul. 7, 2022, Preview Assigned Routes.

* cited by examiner

106

ROUTE MANAGEMENT SYSTEM

202

ROUTE CREATION COMPONENT

204

SENSOR DATA RECEIVING COMPONENT

206

ROUTE PREVIEW COMPONENT

208

ROUTE TRACKING REPORT GENERATION COMPONENT

210

OUPUT COMPONENT

212

DATA STORAGE

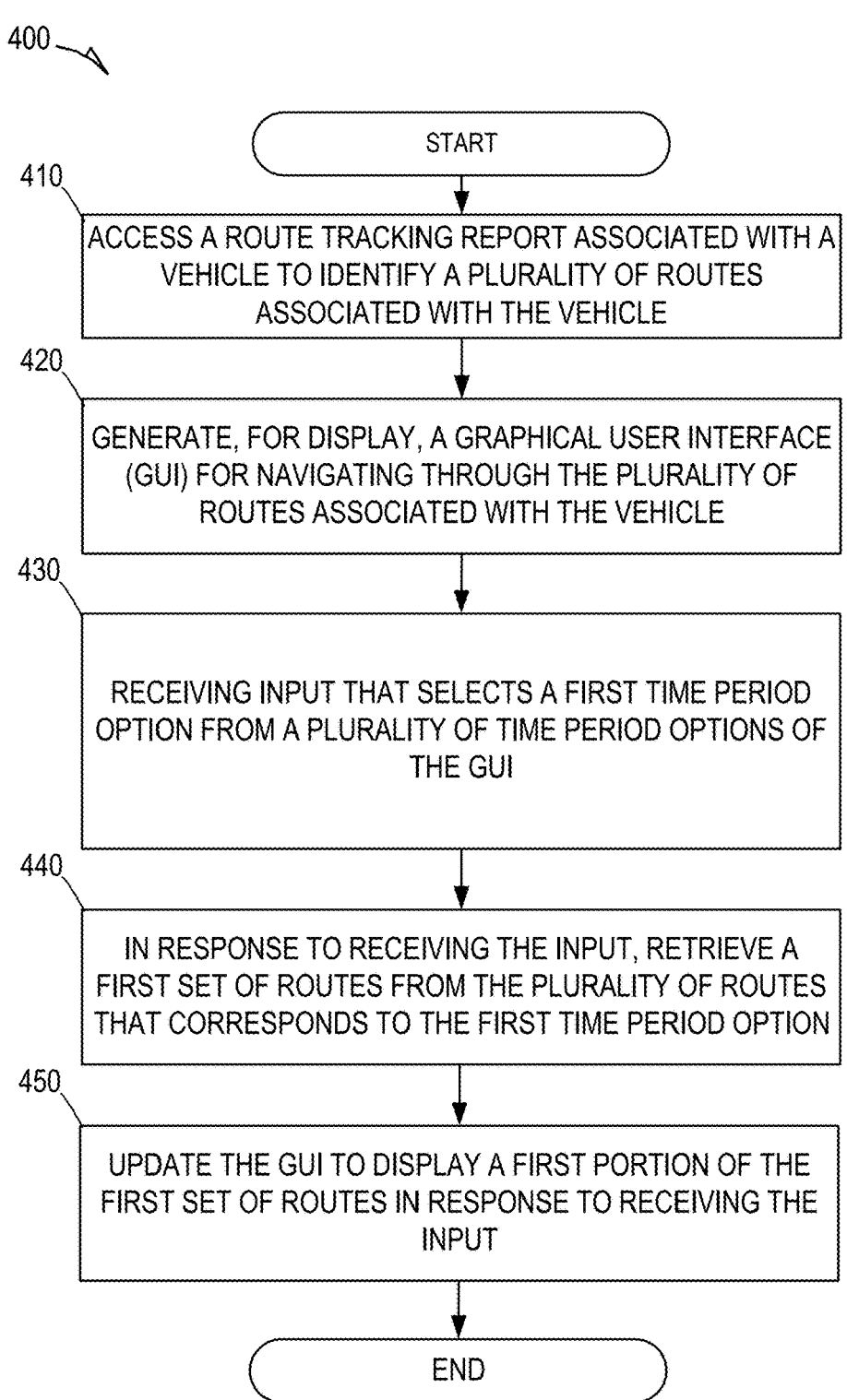

400

410

START

ACCESS A ROUTE TRACKING REPORT ASSOCIATED WITH A VEHICLE TO IDENTIFY A PLURALITY OF ROUTES ASSOCIATED WITH THE VEHICLE

420

GENERATE, FOR DISPLAY, A GRAPHICAL USER INTERFACE (GUI) FOR NAVIGATING THROUGH THE PLURALITY OF ROUTES ASSOCIATED WITH THE VEHICLE

430

RECEIVING INPUT THAT SELECTS A FIRST TIME PERIOD OPTION FROM A PLURALITY OF TIME PERIOD OPTIONS OF THE GUI

440

IN RESPONSE TO RECEIVING THE INPUT, RETRIEVE A FIRST SET OF ROUTES FROM THE PLURALITY OF ROUTES THAT CORRESPONDS TO THE FIRST TIME PERIOD OPTION

450

UPDATE THE GUI TO DISPLAY A FIRST PORTION OF THE FIRST SET OF ROUTES IN RESPONSE TO RECEIVING THE INPUT

END

PREVIEW ASSIGNED ROUTES

PRIORITY APPLICATION

This application is a continuation of U.S. patent application Ser. No. 17/811,152, filed Jul. 7, 2022, and claims priority to U.S. Provisional Patent Application Ser. No. 63/365,804, filed Jun. 3, 2022, the disclosures of which are incorporated by reference herein in their entireties.

TECHNICAL FIELD

Embodiments of the present subject matter relate generally to vehicles and, more specifically, to previewing various routes.

BACKGROUND

Fleet managers track the movement of their vehicles to ensure that they are operating as expected. For example, fleet managers may track whether a vehicle began a route at an expected time, arrived at scheduled stops along the route, and completed the route. This process is often performed manually, however systems have been developed to automate this process. These systems utilize geofences to determine when a vehicle has arrived and/or departed a scheduled stop. In some cases, a vehicle may be scheduled to stop at multiple locations that are within a proximity of each other. For example, a delivery truck may be scheduled to deliver packages at multiple stores located in the same shopping center.

BRIEF DESCRIPTION OF THE DRAWINGS

To easily identify the discussion of any particular element or act, the most significant digit or digits in a reference number refer to the figure number in which that element is first introduced.

FIG. 4 is a flowchart showing a process for displaying assigned routes, according to some example embodiments.

DETAILED DESCRIPTION

Figure 1:
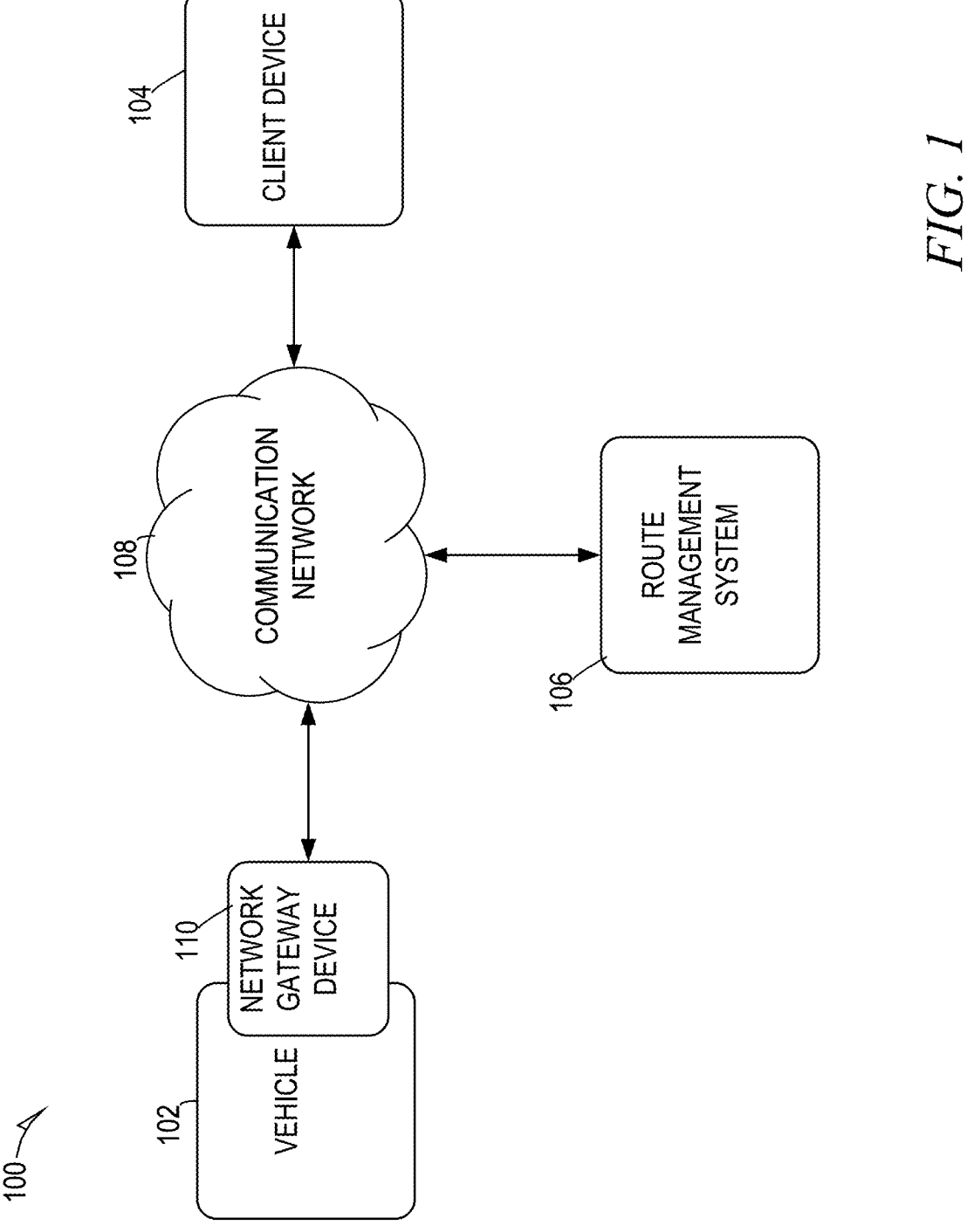
FIG. 1 shows a system for displaying assigned routes, according to some example embodiments.

In the following description, for purposes of explanation, various details are set forth in order to provide a thorough understanding of some example embodiments. It will be apparent, however, to one skilled in the art, that the present subject matter may be practiced without these specific details, or with slight alterations. Reference in the specification to "one embodiment" or "an embodiment" means that a particular feature, structure, or characteristic described in connection with the embodiment is included in at least one embodiment of the present subject matter. Thus, the appearances of the phrase "in one embodiment" or "in an embodiment" appearing in various places throughout the specification are not necessarily all referring to the same embodiment and the embodiments can be combined with each other.

For purposes of explanation, specific configurations and details are set forth in order to provide a thorough understanding of the present subject matter. However, it will be apparent to one of ordinary skill in the art that embodiments of the subject matter described may be practiced without the specific details presented herein, or in various combinations, as described herein. Furthermore, well-known features may be omitted or simplified in order not to obscure the described embodiments. Various examples may be given throughout this description. These are merely descriptions of specific embodiments. The scope or meaning of the claims is not limited to the examples given.

Disclosed are systems, methods, and non-transitory computer-readable media for displaying routes previously assigned to a vehicle and/or driver. A route management system provides for automated fleet tracking. For example, the route management system enables fleet managers to define and assign routes for vehicles in a fleet. A route may be defined based on a set of route variables that describe the route. For example, the set of route variables may include a beginning and ending location of the route, scheduled stops along the route each associated with a geographical location, an order at which the vehicle is to stop at each scheduled stop, a scheduled beginning and ending time of the route, a scheduled arrival and departure time at the scheduled stops, the amount of time the vehicle remains stopped at an individual stop or location, and the like.

The route management system uses the set of route variables defining each route along with sensor data describing the geographic location and/or movement of the vehicles to generate route tracking reports. A route tracking report is a file or document that includes data indicating the movement of a vehicle in relation to its assigned route. For example, the route tracking report may indicate whether a vehicle began and/or ended its route on time, arrived at each of its scheduled stops, arrived and/or departed from each scheduled stop on time, and completed the route in the correct order; the list of stops and their associated locations remaining on the route, and the like. The route tracking report can also include historical information that identifies previously completed/assigned routes, routes that are currently assigned, and routes assigned for completion in the future.

Geofences are used to determine when vehicles have arrived and/or departed from scheduled stops along a route. A geofence is a virtual perimeter for a real-world geographic area. Geofences are established to encompass each scheduled stop along a route. The route management system uses the geofences along with location data describing the current location of the vehicles to determine whether the vehicles have arrived and/or departed the scheduled stops. For example, the route management system may determine that a vehicle has arrived at a scheduled stop if the current location of the vehicle has been within the geofence encompassing the scheduled stop for a threshold period of time. Similarly, the route management system may determine that the vehicle has departed the scheduled stop if the current location of the vehicle is subsequently outside of the geofence encompassing the scheduled stop for another threshold period of time. The route management system can then use the information indicating that the vehicle has departed from the scheduled stop to compute or update one or more ETAs (estimated times of arrival) for one or more subsequent stops along the route.

Problems arise with current systems when multiple routes are assigned to the same vehicle or driver. Current systems typically present assigned routes to a driver in a small 5-day calendar view. Such views are usually disorganized and difficult to discern status of the routes and to identify which routes have previously been completed. The result of this is a low customer satisfaction and missed sales opportunities. Specifically, current systems prevent drivers from seeing routes scheduled for Mondays on Fridays. In order to determine the route scheduled for Monday, the drivers have to access a separate system, such as by calling a dispatcher, and spend a great deal of time and effort searching for upcoming routes. This makes it very difficult for drivers to plan their days and to decide to take on certain routes early. As a result, the drivers need to wait until Monday to view their assigned route, which may introduce delays in starting the route and delivery of cargo. Such delays ultimately frustrate the customers, which causes missed sales opportunities.

Over-the-road drivers usually desire to see their routes further in advance so they can plan their personal time accordingly, For example, a driver may be assigned a route to go from New York to drop off cargo in Los Angeles. Such a driver may choose to leave early to start the route so the driver can arrive early and enjoy free time at the destination. However, typical systems prevent drivers from seeing the next route if the next route is more than 48 hours away and limit the flexibility in planning personal time or taking breaks.

Also, drivers need to plan their days and driving schedule for other routes based on when a current route will end. Because current systems fail to inform the drivers about upcoming routes, the drivers miss opportunities and are unable to efficiently plan their breaks. This can result in drivers that end up being too tired to complete routes on time and can be dangerous to the well-being of the drivers.

In addition, typical systems limit the amount of historical information associated with routes previously completed by certain drivers. Namely, a driver may need to navigate through multiple pages of information to find routes that have previously been driven or completed. Usually, drivers desire to verify that their payment aligns with the completed routes. However, performing such verification requires the driver to navigate through multiple pages of information of a system to search for and find previously assigned routes and their completion status. This ends up frustrating the drivers, and the drivers may be discouraged from verifying their paychecks. As a result, the drivers may be underpaid or overpaid, which can be wasteful. Also, drivers that do navigate through the multiple pages of information to find past routes they have driven waste system resources that can be dedicated to other tasks.

To alleviate this issue, the route management system provides for a graphical user interface (GUI) that simplifies navigation through previously assigned routes, currently assigned/active routes, and routes that are assigned to be driven in the future. For example, the route management system accesses a route tracking report associated with a vehicle to identify a plurality of routes associated with the vehicle. The route management system generates, for display, a GUI for navigating through the plurality of routes associated with the vehicle. The GUI includes a plurality of time period options. The route management system receives input that selects a first time period option from the plurality of time period options and, in response, retrieves a first set of routes from the plurality of routes that corresponds to the first time period option. The route management system updates the GUI to display a first portion of the first set of routes in response to receiving the input. In some examples, the route management system enables an operator to view up to 30 days of historical routes previously assigned and driven by the operator and to view up to 30 days of routes that are assigned to be driven in the future.

By providing an easy-to-use GUI for viewing or previewing past and future routes, drivers are better equipped to manage their deliveries and personal time. Also, by presenting historical routes in response to a selection of an option for accessing the historical routes, the amount of pages of information that a driver needs to navigate through is reduced, which makes operating the system more efficient and reduces the amount of resources needed to accomplish a task. Specifically, the disclosed systems improve a driver's experience by providing them better visibility into upcoming assigned routes. The disclosed systems also improve over-the-road driver retention by allowing such drivers to make personal plans around their assigned trips. This improves the operational efficiency of the route management system by reducing call volumes between drivers and dispatchers, alleviating the dispatchers' burden and enabling them to handle other tasks.

FIG. 1 shows a system 100 for displaying multiple assigned past, present, and future routes. As shown, multiple devices (i.e., vehicle 102, client device 104, and route management system 106) are connected to a communication network 108 and configured to communicate with each other through use of the communication network 108. The communication network 108 is any type of network, including a local area network (LAN), such as an intranet, a wide area network (WAN), such as the internet, a telephone and mobile device network, such as cellular network, or any combination thereof. Further, the communication network 108 may be a public network, a private network, or a combination thereof. The communication network 108 is implemented using any number of communication links associated with one or more service providers, including one or more wired communication links, one or more wireless communication links, or any combination thereof. Additionally, the communication network 108 is configured to support the transmission of data formatted using any number of protocols.

Multiple computing devices can be connected to the communication network 108. A computing device is any type of general computing device capable of network communication with other computing devices. For example, a computing device can be a personal computing device such as a desktop or workstation, a business server, a wearable device, a watch, or a portable computing device, such as a laptop, smart phone, or a tablet personal computer (PC). A computing device can include some or all of the features, components, and peripherals of the machine 900 shown in FIG. 9.

To facilitate communication with other computing devices, a computing device includes a communication interface configured to receive a communication, such as a request, data, and the like, from another computing device in network communication with the computing device and pass the communication along to an appropriate module running on the computing device. The communication interface also sends a communication to another computing device in network communication with the computing device.

The vehicle 102 may be any type of vehicle, such as an automobile, bicycle, motorcycle, skateboard, semi-trailer truck, plane, bus, train, ship, a vessel, and the like. As shown, the vehicle 102 includes a network gateway device 110 (e.g., vehicle gateway) that allows for remote communication between the vehicle 102 and one or more remote computing devices via the communication network 108.

The network gateway device 110 is a hardware device that acts as a gate to a network and enables traffic to flow in and out of the network to other networks. For example, the network gateway device 110 can be established as an edge device of a network or system of nodes within the vehicle 102 (e.g., vehicle networking system). For example, the network or system of nodes may include a variety of sensors, computing devices (e.g., electronic control units (ECUs)), actuators, etc. deployed within the vehicle 102. The network gateway device 110 facilitates wireless communication capabilities by connecting to wireless networks (e.g., cellular, wireless local area network, satellite communication networks, etc.), for purposes of communicating with remote computing devices. The network gateway device 110 may also provide additional functionality, such as firewall functionality by filtering inbound and outbound communications, disallowing incoming communications from suspicious or unauthorized sources, etc.

Use of the network gateway device 110 allows for a remote computing device to transmit data and/or commands to the vehicle 102. Similarly, the network gateway device 110 allows for the vehicle 102 to transmit data, such as sensor data gathered by sensors of the vehicle 102, to a remote computing device. The vehicle 102 may be equipped with a variety of sensors that capture data describing performance of a vehicle 102 and its surroundings. For example, the sensors may include engine speed sensors, fuel temperature sensors, voltage sensors, pressure sensors, radar sensors, location sensors, global positioning system (GPS) sensors that provide a current geographical location of the vehicle 102, light detection and ranking (LIDAR) sensors, imaging sensors (e.g., camera, video camera), and the like.

The route management system 106 is one or more computing devices that allow for generation and management of routes as well as automated route tracking. For example, the route management system 106 may allow administrators to generate routes and assign the generated routes to vehicles 102. The route management system 106 may also provide automated route tracking of the vehicles 102 based on the assigned routes. The route management system 106 may also enable operators, route managers, and drivers to access and view assigned past, present, and future routes.

To utilize the functionality of the route management system 106, users (e.g., fleet managers, drivers, or operators) may use a client device 104 that is connected to the communication network 108 by direct and/or indirect communication. Although the shown system 100 includes only one client device 104 and one vehicle 102, this is only for ease of explanation and is not meant to be limiting. One skilled in the art would appreciate that the system 100 can include any number of client devices 104 and/or vehicles 102. Further, the route management system 106 may concurrently accept communications from and initiate communication messages and/or interact with any number of client devices 104 and vehicles 102, and support connections from a variety of different types of client devices 104, such as desktop computers; mobile computers; mobile communications devices, e.g., mobile phones, smart phones, wearables, watches, glasses, tablets; smart televisions; set-top boxes; and/or any other network enabled computing devices. Hence, the client devices 104 may be of varying type, capabilities, operating systems, and so forth.

A user interacts with a route management system 106 via a client-side application installed on the client device 104. In some embodiments, the client-side application includes a component specific to the route management system 106. For example, the component may be a stand-alone application, one or more application plug-ins, and/or a browser extension. However, the users may also interact with the route management system 106 via a third-party application, such as a web browser or messaging application, that resides on the client device 104 and is configured to communicate with the route management system 106. In either case, the client-side application presents a user interface (UI) or GUI for the user to interact with the route management system 106. For example, the user interacts with the route management system 106 via a client-side application integrated with the file system or via a webpage displayed using a web browser application.

The UI of the client-side application can allow an end user to access and view assigned past, present, and future routes. For example, the UI of the client-side application can access a route tracking report associated with a vehicle to identify a plurality of routes associated with the vehicle. The client-side application can generate, for display, a GUI for navigating through the plurality of routes associated with the vehicle, the GUI including a plurality of time period options. The client-side application can receive input that selects a first time period option from the plurality of time period options. In response to receiving the input, the client-side application can retrieve a first set of routes from the plurality of routes that corresponds to the first time period option. The client-side application can update the GUI to display a first portion of the first set of routes in response to receiving the input. The UI or GUI of the client-side application is discussed in more detail in connection with FIGS. 5-7 below.

As discussed earlier, the route management system 106 enables fleet managers to generate and track vehicle routes. For example, the route management system 106 may provide a UI that allows fleet managers to generate vehicle routes. A vehicle route is a route to be traversed by a vehicle 102 that is defined by a set of route variables. For example, the set of route variables may include a beginning and ending geographic location of the route, scheduled geographic stops along the route, geographical locations of such stops or destinations, geofences associated with each stop or destination, scheduled amount of time to be spent at each stop before departing to a subsequent stop or destination, an order at which the vehicle 102 is to stop at each scheduled stop, a scheduled beginning and ending time of the route, a scheduled arrival and departure time at the scheduled stops, and the like.

In some examples, a vehicle 102 can be provided multiple routes each including a respective set of route variables. The multiple routes may include some of the same stops or destinations (e.g., stops or destinations may overlap between routes) or the multiple routes may include exclusively unique stops or destinations. A vehicle 102 may only traverse one route at a time. Namely, the vehicle 102 can drive along a selected route to each stop of the selected route and such stops are tracked for the selected route. Stops of other routes that have not been selected may not be tracked while the vehicle is navigating or driving along a selected route.

For example, if two routes include a same particular stop or destination, when the vehicle 102 reaches or crosses a geofence of the particular stop or destination associated with a first of the routes which is currently an active route (e.g., because the route was selected for navigation), the particular stop or destination is marked completed in association with the first of the routes but remains incomplete or scheduled in association with a second of the two routes.

The UI provided by the route management system 106 enables fleet managers to select the set of route variables to define a route. For example, the UI may provide a listing of geographic locations and times that a fleet manager may select from to define a route. A fleet manager may use the UI to select geographic locations to be included in the route, such as a beginning location, end location, geographical locations of such stops or destinations, geofences associated with each stop or destination, scheduled amount of time to be spent at each stop before departing to a subsequent stop or destination, and scheduled stops, as well as select an order in which the geographic locations are to be traversed along the route. The UI may also enable a fleet manager to assign times to the selected geographic locations, such as scheduled start time, arrival time, and/or departure time for each. The UI may also enable the fleet manager to select which route is currently active and which are inactive for a particular vehicle 102. The UI may also provide notifications or alerts associated with an active route indicating stops along the route and/or whether a vehicle 102 is early or late with respect to the scheduled arrival/departure time of one or more stops.

The UI may also enable fleet managers to assign the generated routes to individual vehicles 102 and/or vehicle operators or drivers. For example, the user interface may present a listing of individual vehicles 102 and/or vehicle operators from which the fleet manager may select. As another example, the UI may enable an administrator to enter data identifying a vehicle 102 or vehicle operator, as well as enter a new vehicle 102 or vehicle operator.

The route management system 106 provides for automated tracking of the vehicles 102 based on the routes assigned by the fleet manager. For example, the route management system 106 receives sensor data describing the current location and/or motion of the vehicle 102, which the route management system 106 uses to track location of the vehicle 102 and to compute/update estimated times of arrival (ETAs) of stops along the route. As referred to herein, the terms "stop," "destination" and "location" may be used interchangeably and may have the same meaning. The sensor data may be received from the vehicle 102 and/or from a client device 104 of the vehicle operator in real time or periodically.

The route management system 106 uses the set of route variables defining a route along with the sensor data describing the geographic location and/or movement of the vehicle 102 to generate a route tracking report describing the tracked movement of the vehicle 102 in relation to its assigned route. For example, the route tracking report may indicate whether the vehicle 102 began and/or ended its route on time, arrived at each of its scheduled stops, arrived and/or departed from each scheduled stop on time, completed the route in the correct order, and the like. The route tracking report may include some or all of the information of the route including the route variables.

In some examples, the route tracking report can include historical, current, and future route information. Namely, the route tracking report can include information that identifies a list of routes previously assigned and completed or partially completed by a driver. The route tracking report can include currently assigned routes that are actively being driven and/or completed. The route tracking report can include routes assigned in the future to be driven at a future date. Such routes can include updates or changes which are tracked and stored by the route tracking report.

The route management system 106 uses geofences to determine when vehicles 102 have arrived and/or departed from scheduled stops along a route. A geofence is a virtual perimeter for a real-world geographic area. Geofences are established to encompass each scheduled stop along a route. The route management system 106 uses the geofences along with location data describing the current location of the vehicles 102 to determine whether the vehicles 102 have arrived and/or departed the scheduled stops. For example, the route management system 106 may determine that a vehicle 102 has arrived at a scheduled stop if the current location of the vehicle 102 has been within the geofence encompassing the scheduled stop for a threshold period of time. Similarly, the route management system 106 may determine that the vehicle 102 has departed the scheduled stop if the current location of the vehicle 102 is subsequently outside of the geofence encompassing the scheduled stop for another threshold period of time.

Figure 2:
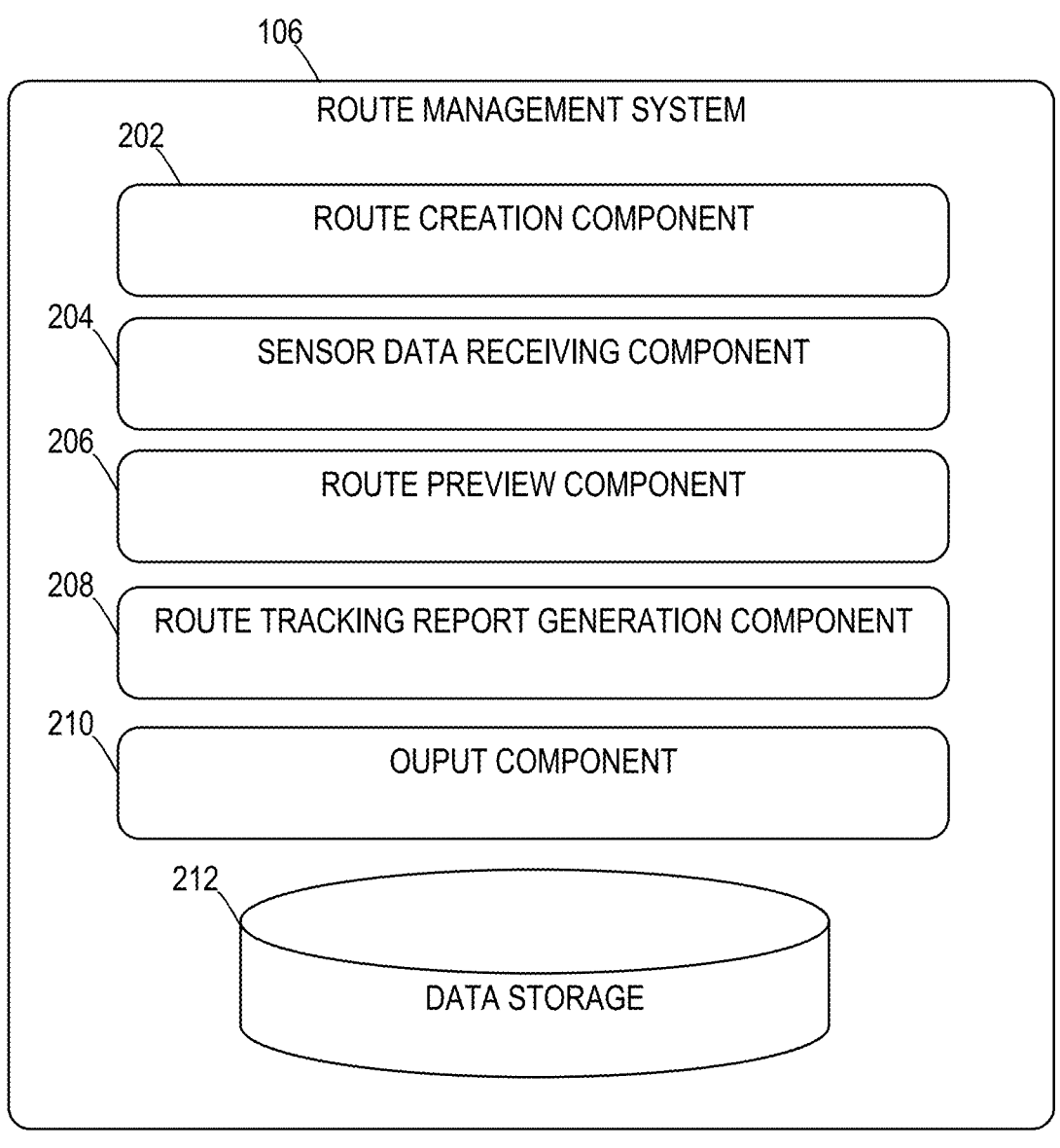
FIG. 2 is a block diagram of the route management system, according to some example embodiments.

FIG. 2 is a block diagram of the route management system 106, according to some example embodiments. To avoid obscuring the inventive subject matter with unnecessary detail, various functional components (e.g., modules) that are not germane to conveying an understanding of the inventive subject matter have been omitted from FIG. 2. However, a skilled artisan will readily recognize that various additional functional components may be supported by the route management system 106 to facilitate additional functionality that is not specifically described herein. Furthermore, the various functional components depicted in FIG. 2 may reside on a single computing device or may be distributed across several computing devices in various arrangements such as those used in cloud-based architectures.

As shown, the route management system 106 includes a route creation component 202, a sensor data receiving component 204, a route preview component 206, a route tracking report generation component 208, an output component 210, and a data storage 212.

The route creation component 202 enables fleet managers to generate routes and assign routes to vehicles 102. For example, the route creation component 202 may provide a UI that allows fleet managers to generate vehicle routes. A vehicle route is a route to be traversed by a vehicle 102 that is defined by a set of route variables, discussed above. For example, the set of route variables may include a beginning and ending geographic location of the route, scheduled geographic stops along the route, an order at which the vehicle 102 is to stop at each scheduled stop, a scheduled beginning and ending time of the route, a scheduled arrival and departure time at the scheduled stops, and the like. The route variables may also include geographical locations of such stops or destinations, geofences associated with each stop or destination, and/or scheduled amount of time to be spent at each stop before departing to a subsequent stop or destination. The route variables may be stored as part of a route tracking report in data storage 212.

The UI provided by the route creation component 202 enables fleet managers to select the set of route variables for a route. For example, the UI may provide a listing of geographic locations and times that a fleet manager may select from to define a route. A fleet manager may use the UI to select geographic locations to be included in the route, such as a beginning location, end location, and scheduled stops, as well as select an order in which the geographic locations are to be traversed along the route. The UI may also enable a fleet manager to assign times to the selected geographic locations, such as scheduled start time, arrival time, and/or departure time for each. The UI may also enable the fleet managers to specify geographical locations of such stops or destinations, geofences associated with each stop or destination, and/or scheduled amount of time to be spent at each stop before departing to a subsequent stop or destination.

The UI may also enable fleet managers to assign the generated routes to individual vehicles 102 and/or vehicle operators or drivers. For example, the user interface may present a listing of individual vehicles 102 and/or vehicle operators from which the fleet manager may select. As another example, the user interface may enable an administrator to enter data identifying a vehicle 102 or vehicle operator, as well as enter a new vehicle 102 or vehicle operator. The UI may also enable the fleet managers to specify which of a set of routes assigned to a given vehicle 102 is currently active and being tracked. Tracking a route includes determining whether stops along the route have been completed or are scheduled for arrival. Stops that are being tracked can be used to generate ETAs of the corresponding stops.

The route creation component 202 stores data defining the created routes in the data storage 212, where it can be accessed by other components of the route management system 106. For example, the data stored in the data storage 212 may be associated with an account of the route management system 106 and/or specific vehicles 102 to which the route has been assigned.

The sensor data receiving component 204 receives sensor data used to provide automated route tracking. For example, the sensor data receiving component 204 receives sensor data describing the current location and/or motion of a vehicle 102. The sensor data may be received from the vehicle 102 and/or from a client device 104 of the vehicle operator that is operating the vehicle 102.

The route tracking report generation component 208 generates a route tracking report for access by the route preview component 206. The route tracking report describes the tracked movement of the vehicle 102 in relation to its assigned route. For example, the route tracking report may indicate whether the vehicle 102 began and/or ended its route on time, arrived at each of its scheduled stops, arrived and/or departed from each scheduled stop on time, completed the route in the correct order, and the like. The route tracking report may include information on routes tracked in the past for a vehicle 102, routes currently assigned to the vehicle 102, and routes assigned to the vehicle to be driven in the future. In some examples, the route tracking report includes route information for up to 30 days in the past and 30 days in the future although other suitable time periods can be used.

The route preview component 206 provides for the access and display of routes assigned to a vehicle 102 in the past, present, and future. The route preview component 206 uses the set of route variables defining a route along with the sensor data received by the sensor data receiving component 204 to track the vehicle's 102 movement along its assigned route and generate updates and status information for the past, present, and future routes. Specifically, the route preview component 206 accesses a route tracking report associated with a vehicle to identify a plurality of routes associated with the vehicle. The route preview component 206 generates, for display, a GUI for navigating through the plurality of routes associated with the vehicle. The GUI includes a plurality of time period options. The route preview component 206 receives input that selects a first time period option from the plurality of time period options; in response to receiving the input. The route preview component 206 retrieves a first set of routes from the plurality of routes that corresponds to the first time period option and updates the GUI to display a first portion of the first set of routes in response to receiving the input.

In some examples, the plurality of time period options includes a first option for accessing past routes, a second option for accessing current routes, and a third option for accessing future routes. Specifically, the route preview component 206 can determine that the first time period option that was selected represents routes that have been performed in the past relative to a current date. In such cases, the route preview component 206 sets a past time period range including a starting date corresponding to a past date that precedes the current date by a threshold number of days and including an ending date corresponding to one day previous to the current date. Then the route preview component 206 searches the plurality of routes for the first set of routes associated with the past time period range. In some cases, the first set of routes have been completed on respective dates within the past time period range. In some cases, the GUI displays a first identifier of a first route of the first set of routes that has previously been completed and a second identifier of a second route of the first set of routes that has previously been completed. The first and second identifiers can be displayed in reverse chronological order.

In some examples, the first identifier includes a description of the first route and a completion status. The completion status can represent a quantity of stops on the first route that have been completed relative to a total quantity of stops associated with the first route. The first identifier can indicate a quantity of stops of the first route that have been skipped. In some cases, the GUI displays the past time period range. In some examples, the threshold number of days includes 30 days.

In some examples, the route preview component 206 receives a request to access additional portions of the first set of routes and in response to receiving the request, the route preview component 206 updates the GUI to display a second portion of the second of routes. Namely, the route preview component 206 can load a threshold number of routes (e.g., 5 routes for a present, past, or future time period) at a time and loads the threshold number of more routes (e.g., 5 more routes) in response to a request for additional routes.

In some examples, the route preview component 206 determines that the first time period option represents routes that are assigned to be completed in the future relative to a current date. In such cases, the route preview component 206 sets a future time period range including a starting date corresponding to one day following the current date and an ending date corresponding to a date that follows the current date by a threshold number of days. The route preview component 206 then searches the plurality of routes for the first set of routes associated with the future time period range. In some cases, the first set of routes are assigned to be completed within the future time period range. In such circumstances, the GUI displays a first identifier of a first route of the first set of routes that is assigned to be completed within the future time period range and a second identifier of a second route of the first set of routes that is assigned to be completed within the future time period range. The first and second identifiers can be displayed in chronological order.

The first identifier can include a description of the first route and a date on which the first route will be started. The first identifier can include a new indicator and/or an updated indicator. The new indicator can be displayed in response to determining that the first route is displayed for a first time to an operator associated with the vehicle 102. The updated indicator can be displayed in response to determining that a change has been made to the first route which is being displayed for a first time to an operator associated with the vehicle 102.

In some examples, the route preview component 206 determines that the first time period option selected by the operator represents routes that are assigned to be completed on a current date. In such cases, the route preview component 206 searches the plurality of routes for the first set of routes associated with the current date. The route preview component 206 can display the first portion of routes including a first identifier of a first route of the first set of routes that is currently active and a second identifier of a second route of the first set of routes that is assigned to be completed after the first route. In some cases, the second identifier can indicate an overdue status in response to determining that a current time is past a scheduled start time of the second route.

In some examples, the route preview component 206 implements a machine learning model (e.g., an artificial neural network) to highlight or visually distinguish certain past routes or future routes that meet certain conditions. For example, the machine learning model can be trained to predict billing or accounting errors. To do so, the machine learning model can process route variables of one or more training drivers to establish a relationship between the route variables and ground truth billing or accounting errors. For example, the machine learning model can access a first set of training data that includes route variables of one or more training drivers and extract features from the first set of training data to estimate billing or accounting errors associated with the first set of training data. The machine learning model can then obtain the ground truth billing or accounting errors of the first set of training data and compute a deviation of the estimated billing or accounting errors from the ground truth billing or accounting errors. The machine learning model can then update parameters of the machine learning model based on the deviation and then process a second set of training data.

In some examples, the trained machine learning model can then be applied to past route information of a new driver including features extracted from the past route information. The trained machine learning model can predict one or more routes in the past route information that are likely associated with billing or account errors. Such predicted one or more routes can have their corresponding route identifiers in the GUI (displayed in response to receiving selection of the past routes option, such as the time periods option corresponding to past routes) visually highlighted or distinguished (e.g., presented at the top of the GUI or marked with certain colors or fonts). This allows the new driver to quickly and easily identify routes the driver has previously driven which are likely associated with accounting or billing errors.

As another example, the machine learning model can be trained to predict one or more routes that are candidates for starting early. Such routes can include stops or can include destinations along the route path that are associated with events of interest or popular travel destinations. To do so, the machine learning model can process route variables of one or more training drivers to establish a relationship between the route variables and ground truth route candidates for starting early. For example, the machine learning model can access a first set of training data that includes route variables of one or more training drivers and extract features from the first set of training data to estimate route candidates for starting early associated with the first set of training data. The machine learning model can then obtain the ground truth route candidates for starting early of the first set of training data and compute a deviation of the estimated route candidates for starting early from the ground route candidates for starting early. The machine learning model can then update parameters of the machine learning model based on the deviation and then process a second set of training data.

In some examples, the trained machine learning model can then be applied to past route information of a new driver including features extracted from the past route information. The trained machine learning model can predict one or more routes in the past route information that are likely associated with being started early. Such predicted one or more routes can have their corresponding route identifiers in the GUI (displayed in response to receiving selection of the future routes option, such as the time periods option corresponding to future routes) visually highlighted or distinguished (e.g., presented at the top of the GUI or marked with certain colors or fonts). This allows the new driver to quickly and easily identify routes the driver may desire to start early to be able to visit the popular travel destinations or events of interest.

Figure 3:
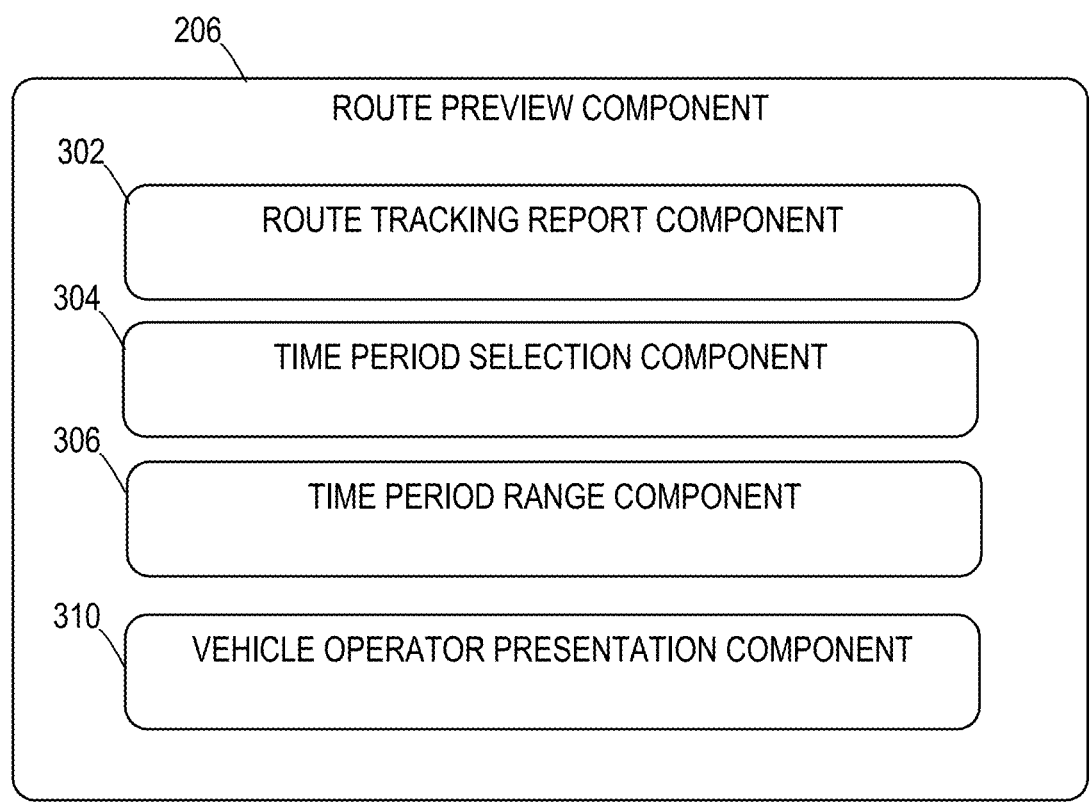
FIG. 3 is a block diagram of the route preview component, according to some example embodiments.

As shown in FIG. 3, the route preview component 206 may include a route tracking report component 302, a time period selection component 304, a time period range component 306, and a vehicle operator presentation component 310.

The route tracking report component 302 can communicate with the route tracking report generation component 208 to access and obtain route information (e.g., a route tracking report) for one or more current routes (routes that are being driven on a current day), one or more routes previously assigned and driven (e.g., routes that were previously assigned and completed or partially completed in a prior time period, such as 30 days prior to the current day), and one or more routes assigned to be driven in the future (e.g., routes that are assigned to be driven in a future time period, such as 30 days following the current day). The route information can include any of the route variables that form the route, such as the locations of the stops, the scheduled arrival/departure times of each stop, time to be spent at each stop, break times for a driver, and so forth.

The route tracking report component 302 can present a GUI to an operator or driver. The time period selection component 304 can detect user input that interacts with the GUI. The GUI can simultaneously present three time period options. A first of the three time period options can be associated with past routes driven by the operator, a second of the three time period options can be associated with routes being driven on a current day or date, and a third of the three time period options can be associated with routes assigned to be driven at a future time period. The three time period options can be displayed as separate tabs or in any other arrangement.

In some examples, the time period selection component 304 can detect that a selection of the past routes option (e.g., the first time period option) was selected. In response, the time period selection component 304 can communicate with the route tracking report component 302 to identify a set of routes associated with the driver or vehicle 102 (e.g., by providing an identifier of the driver or vehicle 102). The time period selection component 304 can communicate the selection of the past routes option to the time period range component 306. The time period range component 306 can determine the current date and can obtain a threshold period of time (e.g., 30 days). The time period range component 306 can compute a range of time periods including a starting date and an ending date. The starting date can be computed by subtracting the threshold period of time from the current date and the ending date can be computed by subtracting one day from the current date.

The time period range component 306 can then search the set of routes associated with the driver or vehicle 102 to identify a collection of routes that were driven or completed within the range of time periods (e.g., between the starting date and the ending date). The time period range component 306 can also obtain status information for each route in the collection, such as the number of stops completed or skipped in each route. The time period range component 306 provides the collection of routes to the vehicle operator presentation component 310.

In some examples, the vehicle operator presentation component 310 can display a first portion of the collection of routes to the operator of the vehicle 102. The first portion can include a threshold quantity of routes in the collection of routes. For example, the vehicle operator presentation component 310 can initially retrieve five routes that were most recently completed from the collection of routes. The routes can be presented in chronological or reverse chronological order using respective identifiers of each route. The vehicle operator presentation component 310 can present the retrieved five routes to the user. The vehicle operator presentation component 310 can receive input or a request from the user to view additional routes. In response, the vehicle operator presentation component 310 retrieves a second portion of the routes including another threshold quantity of routes (e.g., five more routes). The vehicle operator presentation component 310 can then present the second portion of the routes. The vehicle operator presentation component 310 can present with each identifier of the routes an indication of status of completion. The indication can specify how many stops were completed for each route, how many stops were skipped, the total number of stops of each route, and/or a description or title of each route.

In some examples, the time period selection component 304 can detect that a selection of the future routes option (e.g., the third time period option) was selected. In response, the time period selection component 304 can communicate with the route tracking report component 302 to identify a set of routes associated with the driver or vehicle 102 (e.g., by providing an identifier of the driver or vehicle 102). The time period selection component 304 can communicate the selection of the future routes option to the time period range component 306. The time period range component 306 can determine the current date and can obtain a threshold period of time (e.g., 30 days). The time period range component 306 can compute a range of time periods including a starting date and an ending date. The ending date can be computed by adding the threshold period of time to the current date and the starting date can be computed by adding one day to the current date.

The time period range component 306 can then search the set of routes associated with the driver or vehicle 102 to identify a collection of routes that were driven or completed within the range of time periods (e.g., between the starting date and the ending date). The time period range component 306 can also obtain status information for each route in the collection, such as whether the route is new or includes updates or changes. The time period range component 306 provides the collection of routes to the vehicle operator presentation component 310.

In some examples, the vehicle operator presentation component 310 can display a first portion of the collection of routes to the operator of the vehicle 102. The first portion can include a threshold quantity of routes in the collection of routes. For example, the vehicle operator presentation component 310 can initially retrieve five routes that are scheduled to be completed from the collection of routes. The routes can be presented in chronological or reverse chronological order using respective identifiers of each route. The vehicle operator presentation component 310 can present the retrieved five routes to the user. The vehicle operator presentation component 310 can receive input or a request from the user to view additional routes. In response, the vehicle operator presentation component 310 retrieves a second portion of the routes including another threshold quantity of routes (e.g., five more routes). The vehicle operator presentation component 310 can then present the second portion of the routes. The vehicle operator presentation component 310 can present with each identifier of the routes an indication of status of each route, such as whether the route is new (e.g., never presented before to the driver) or includes changes (e.g., the route is different or includes additional or less stops than when the route was last presented to the driver).

In some examples, the time period selection component 304 can detect that a selection of the current routes option (e.g., the second time period option) was selected. In response, the time period selection component 304 can communicate with the route tracking report component 302 to identify a set of routes associated with the driver or vehicle 102 (e.g., by providing an identifier of the driver or vehicle 102). The time period selection component 304 can communicate the selection of the current routes option to the time period range component 306. The time period range component 306 can determine the current date and can retrieve any route that is scheduled to be driven or that was completed on the current date.

The vehicle operator presentation component 310 can then present the routes that are scheduled to be driven or that were completed on the current date in chronological order or reverse chronological order. In some examples, the vehicle operator presentation component 310 can divide the routes scheduled or associated with the current date according to status. For example, a first route can be presented in an active routes category, a second route can be presented in a later today category, and a third route can be presented in a completed today category. In response to receiving selection of one of the categories that are presented, the corresponding routes associated with that category are displayed. Once a route is completed, the route identifier of that route can be moved to the corresponding category (e.g., from the active route to the completed today category).

Referring back to FIG. 2, the output component 210 provides the route tracking report to a fleet manager or other user. For example, the output component 210 may transmit the route tracking report to the client device 104 of a fleet manager or other user via email, text message, and the like. As another example, the output component 210 may provide the route tracking report within a user interface that can be accessed by a fleet manager. For example, a fleet manager may use a client device 104 to interact with the route management system 106 and access the user interface provided by the output component 210.

The output component 210 may also transmit notifications based on the data included in a route tracking report.

For example, the output component 210 may transmit a notification to a client device 104 of a vehicle operator indicating that the vehicle operator has missed a scheduled stop, is behind schedule, is not following the correct route, and the like. Similarly, the output component 210 may transmit a notification to a client device 104 of a fleet manager or other user to provide status updates associated with a route, such as the vehicle 102 having started at a route, arrived at a scheduled stop, left a scheduled stop, missed a scheduled stop, completed the route, and the like.

FIG. 4 is a flowchart showing a process 400 for previewing assigned routes, according to some example embodiments. The process 400 may be embodied in computer-readable instructions for execution by one or more processors such that the operations of the process 400 may be performed in part or in whole by the route management system 106; accordingly, the process 400 is described below by way of example with reference thereto. However, it shall be appreciated that at least some of the operations of the process 400 may be deployed on various other hardware configurations and the process 400 is not intended to be limited to the route management system 106.

At operation 410, the route management system 106 accesses a route tracking report associated with a vehicle to identify a plurality of routes associated with the vehicle, as discussed above.

At operation 420, the route management system 106 generates, for display, a GUI for navigating through the plurality of routes associated with the vehicle, as discussed above.

At operation 430, the route management system 106 receives input that selects a first time period option from a plurality of time period options of the GUI, as discussed above.

At operation 440, the route management system 106 in response to receiving the input, retrieves a first set of routes from the plurality of routes that corresponds to the first time period option, as discussed above.

At operation 450, the route management system 106 updates the GUI to display a first portion of the first set of routes in response to receiving the input, as discussed above.

Figure 5:
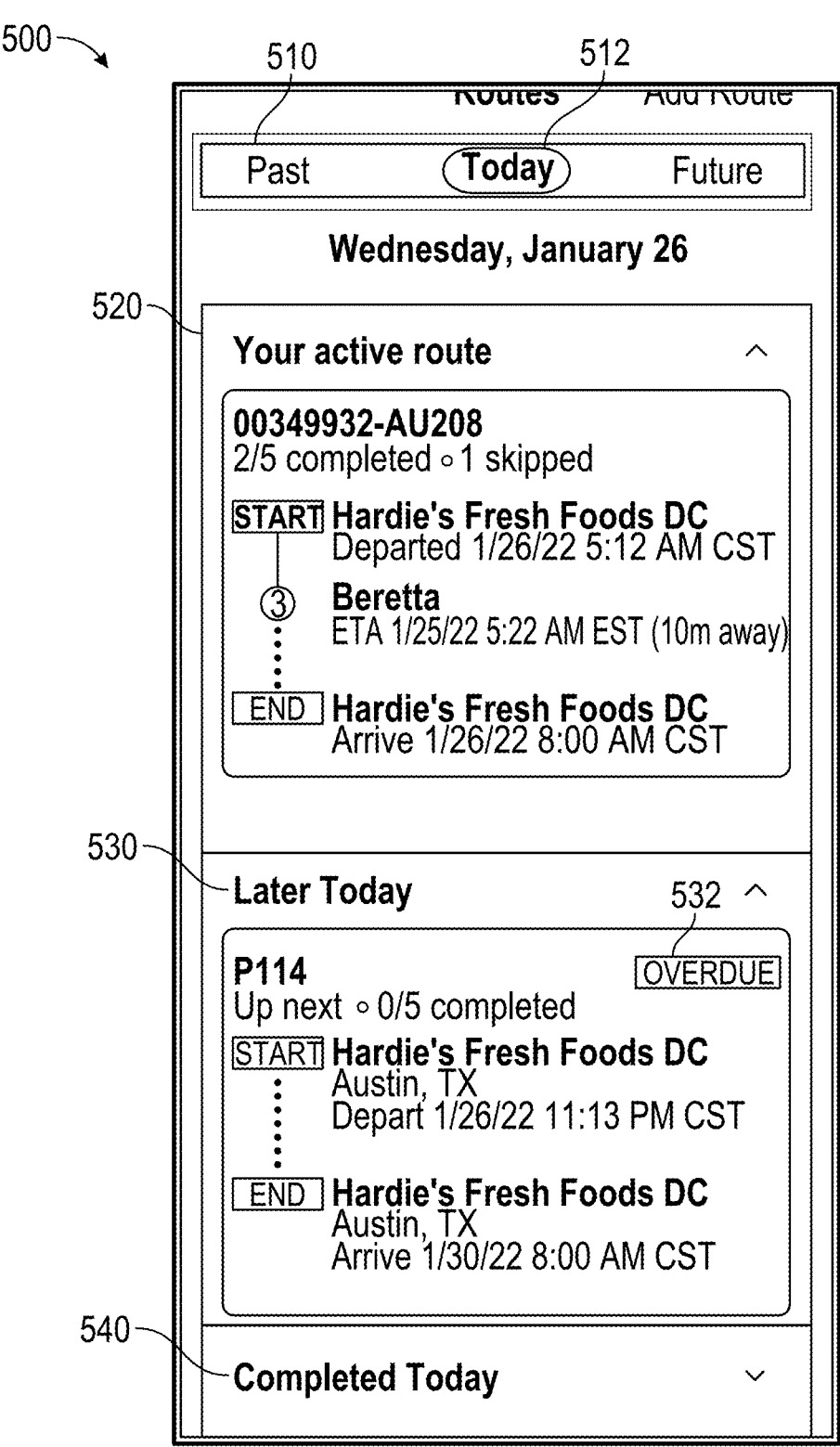
FIG. 5 is an example user interface for displaying assigned routes, according to some example embodiments.

FIG. 5 is an example GUI 500 for displaying multiple routes assigned in the past, present and future, according to some example embodiments. As shown in FIG. 5, the GUI 500 includes a time period selection region 510. The time period selection region 510 includes a first option for past routes, a second option 512 for current routes, and a third option for future routes. In response to receiving a selection of the second option 512 for current routes, the GUI 500 presents a list of categories associated with routes scheduled for completion on the current date or that are completed today. For example, the GUI 500 can present an active route category 520. In response to receiving a user selection of the active route category 520, the GUI 500 retrieves a route that is currently active on the current date and presents an identifier of the currently active route in the active route category 520. The identifier can include a description of the route, a description of stops along the route, an ETA of the next stops along the route, a total number of stops included as part of the route, a total number of completed stops of the route, and a total number of skipped stops of the route.

The GUI 500 can receive a selection of the later today category 530. In response, the GUI 500 retrieves a route that is scheduled for completion or to be driven on the current date, such as after the currently active route. In response to receiving the selection of the later today category 530, the GUI 500 reveals or presents one or more identifiers of the respective scheduled route(s) in the later today category 530. Each identifier can include a description of the route, a description of stops along the route, an ETA of the next stops along the route, a total number of stops included as part of the route, a total number of completed stops of the route, and a total number of skipped stops of the route. In some examples, the GUI 500 can obtain a scheduled start time for the route listed in the later today category 530. The GUI 500 can compare the scheduled start time to the current time or to an ETA of the first stop associated with the route listed in the later today category 530. In response to determining that the current time or the ETA is later than the scheduled start time, the GUI 500 can present an indicator 532 (e.g., overdue indicator) in the route identifier to inform the driver that the route associated with the identifier is late or overdue.

The GUI 500 can receive a selection of the completed today category 540. In response, the GUI 500 retrieves one or more routes that have been completed on the current date. In response to receiving the selection of the completed today category 540, the GUI 500 presents one or more identifiers of the respective completed route(s) in the completed today category 540. Each identifier can include a description of the route, a description of stops along the route, an ETA of the next stops along the route, a total number of stops included as part of the route, a total number of completed stops of the route, a total number of skipped stops of the route, the date of completion of the route, and so forth.

Figure 6:
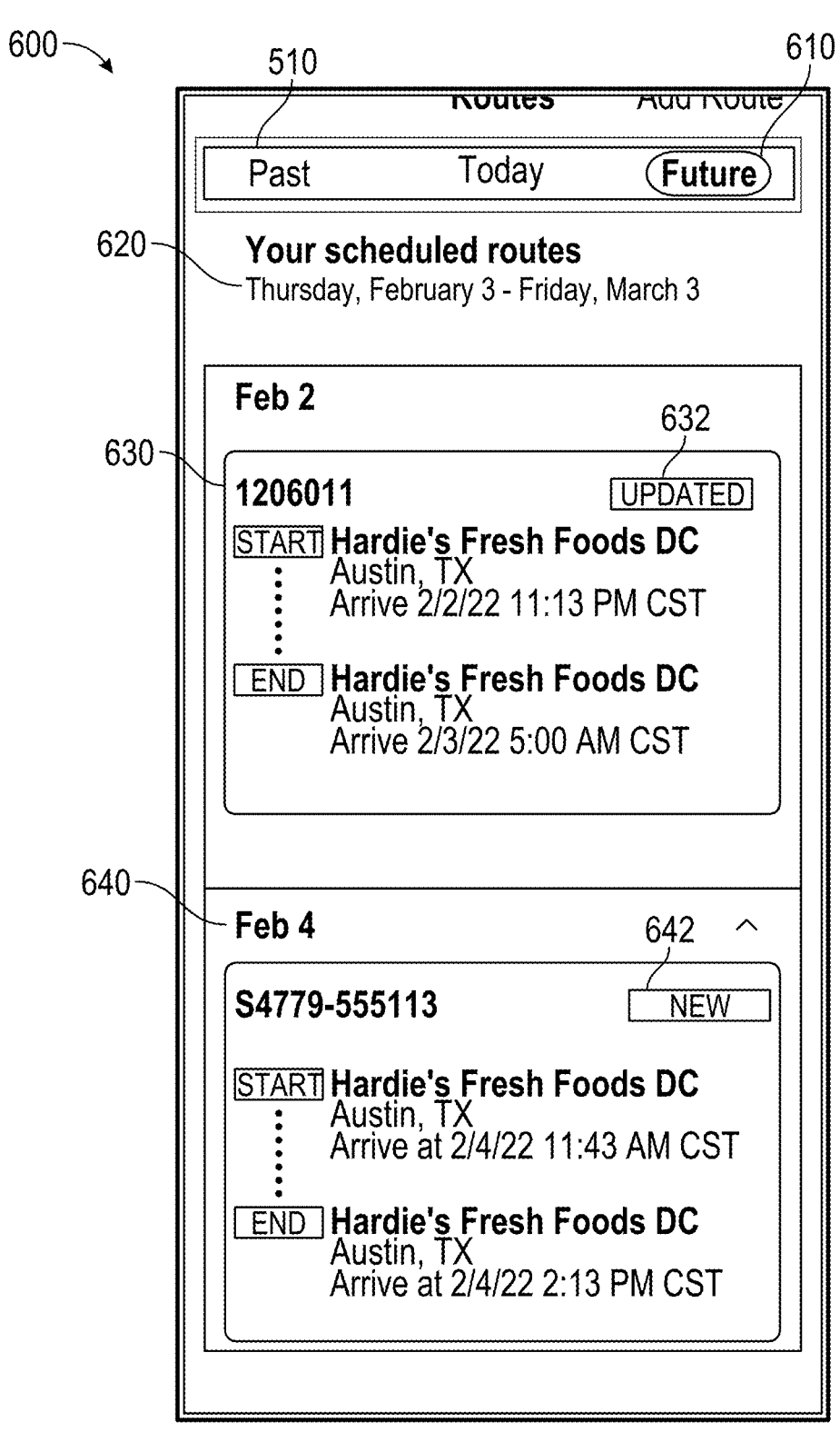
FIG. 6 is an example user interface for displaying assigned routes, according to some example embodiments.

The GUI 500 can detect input that selects the third option for future routes. In response, the GUI 500 updates the user interface of the list of routes that are presented with the GUI 600 shown in FIG. 6. Specifically, as shown in FIG. 6, selection of the third option 610 for future routes is selected. In response, the GUI 600 retrieves the time period range computed for the future routes by the time period range component 306. The GUI 600 displays the time period range 620 in the user interface. In some cases, the time period range 620 can be adjusted based on user input and the displayed routes are automatically re-filtered and updated.

The GUI 600 retrieves a list of routes scheduled to be completed within the time period range 620. The GUI 600 displays a list of dates on which routes are scheduled for completion. Namely, the GUI 600 can determine that a first route is scheduled for completion or to be started on a first date and that a second route is scheduled for completion or to be started on a second date. The first date and second date may or may not be adjacent (e.g., the first date can be February 2 and the second date can be February 4). The GUI 600 can determine that there exist no routes scheduled to be started or completed on a date between the first and second dates. In such cases, the GUI 600 only presents the first and second dates and the corresponding first and second identifiers 630 and 640 of the first and second routes scheduled to be started or completed on the first and second dates, respectively.

In some examples, the GUI 600 determines that the route associated with the first identifier 630 has been modified, changed, or updated (e.g., stops have been added or removed from the route associated with the first identifier 630) since the last time the GUI 600 of the future routes was presented to the user in which the first identifier 630 was displayed. In such cases, the GUI 600 presents an updated indicator 632 to draw attention to the route associated with the first identifier 630 informing the operator or user that a change has been made to the route since the last time the operator or user viewed the route. As another example, the GUI 600 determines that the route associated with the second identifier 640 is new since the last time the GUI 600 of the future routes was presented to the user. Namely, the route associated with the second identifier 640 has never before been presented to the user and is presented to the user for the first time. In such cases, the GUI 600 presents a new indicator 642 to draw attention to the route associated with the second identifier 640 informing the operator or user that the route is new.

In some examples, the GUI 600 presents identifiers of future routes for a threshold quantity of routes (e.g., 5 routes) at a time. The GUI 600 can receive a request to view additional routes. In response to receiving the request, the GUI 600 retrieves additional routes (e.g., another threshold quantity of routes) for presentation to the user. The identifiers of the routes can be presented in chronological or reverse chronological order.

Figure 7:
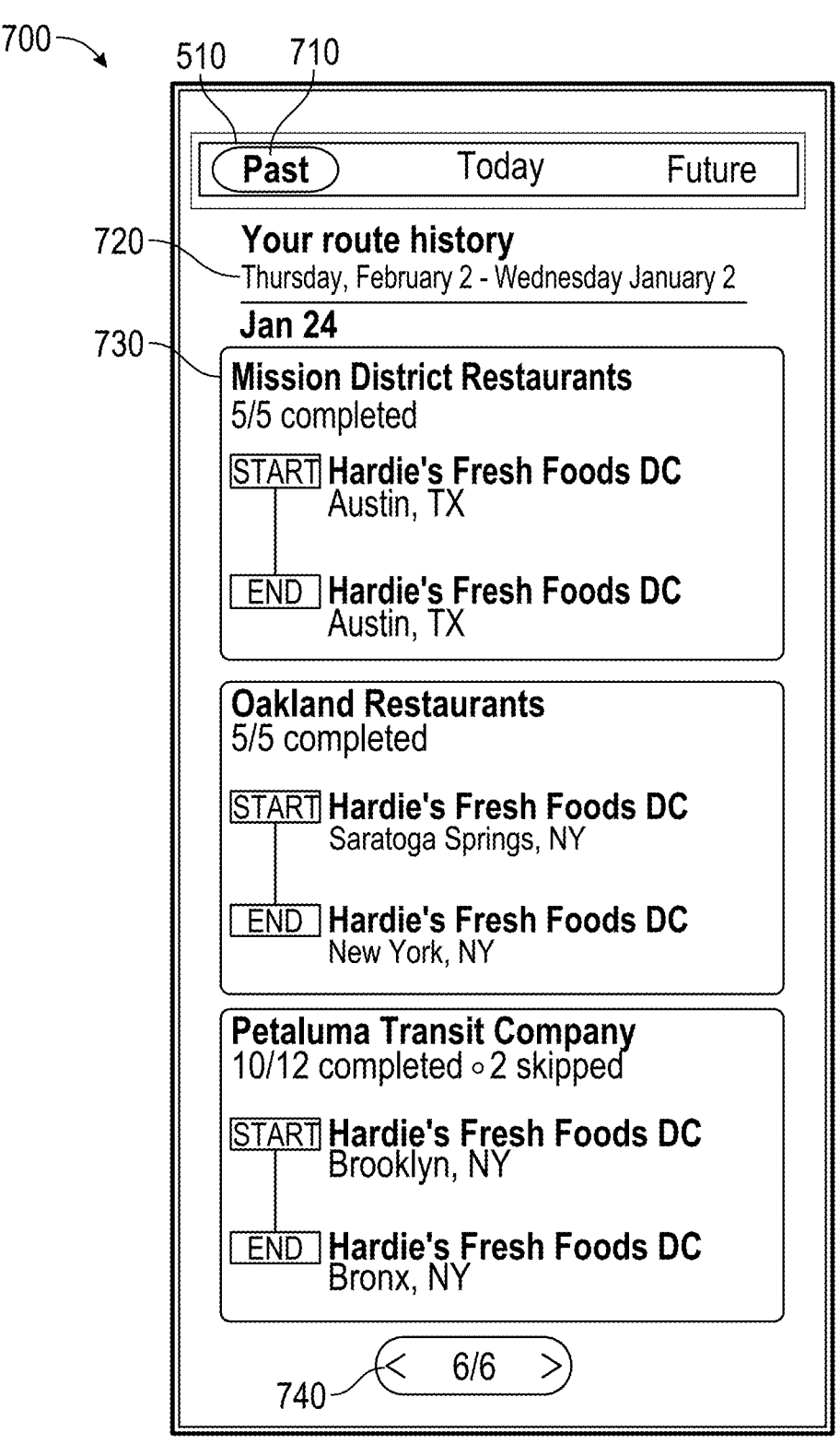
FIG. 7 is an example user interface for displaying assigned routes, according to some example embodiments.

The GUI 500 or GUI 600 can detect input that selects the first option for past routes. In response, the GUI 500 or GUI 600 updates the user interface of the list of routes that are presented with the GUI 700 shown in FIG. 7. Specifically, as shown in FIG. 7, selection of the first option 710 for past routes is selected. In response, the GUI 700 retrieves the time period range computed for the past routes by the time period range component 306. The GUI 700 displays the time period range 720 in the user interface. In some cases, the time period range 720 can be adjusted based on user input and the displayed routes are automatically re-filtered and updated.

In some examples, the GUI 700 presents identifiers 730 of past routes for a threshold quantity of routes (e.g., 5 routes) at a time. The GUI 700 can receive a request to view additional routes, such as by selection of the option for more routes 740. In response to receiving the request by way of the selection of the option for more routes 740, the GUI 700 retrieves additional routes (e.g., another threshold quantity of routes) for presentation to the user. The identifiers 730 of the routes can be presented in chronological or reverse chronological order. The identifiers 730 that are presented can each specify a description of the corresponding route associated with the identifier, description of stops along the route, a total number of stops included as part of the route, a total number of completed stops of the route, a total number of skipped stops of the route, the date of completion of the route, and so forth. The identifiers can also present a payout associated with each route.

As discussed above, machine learning models can be applied to visually distinguish certain identifiers of routes in any of the GUIs 500, 600 or 700.

Software Architecture

Figure 8:
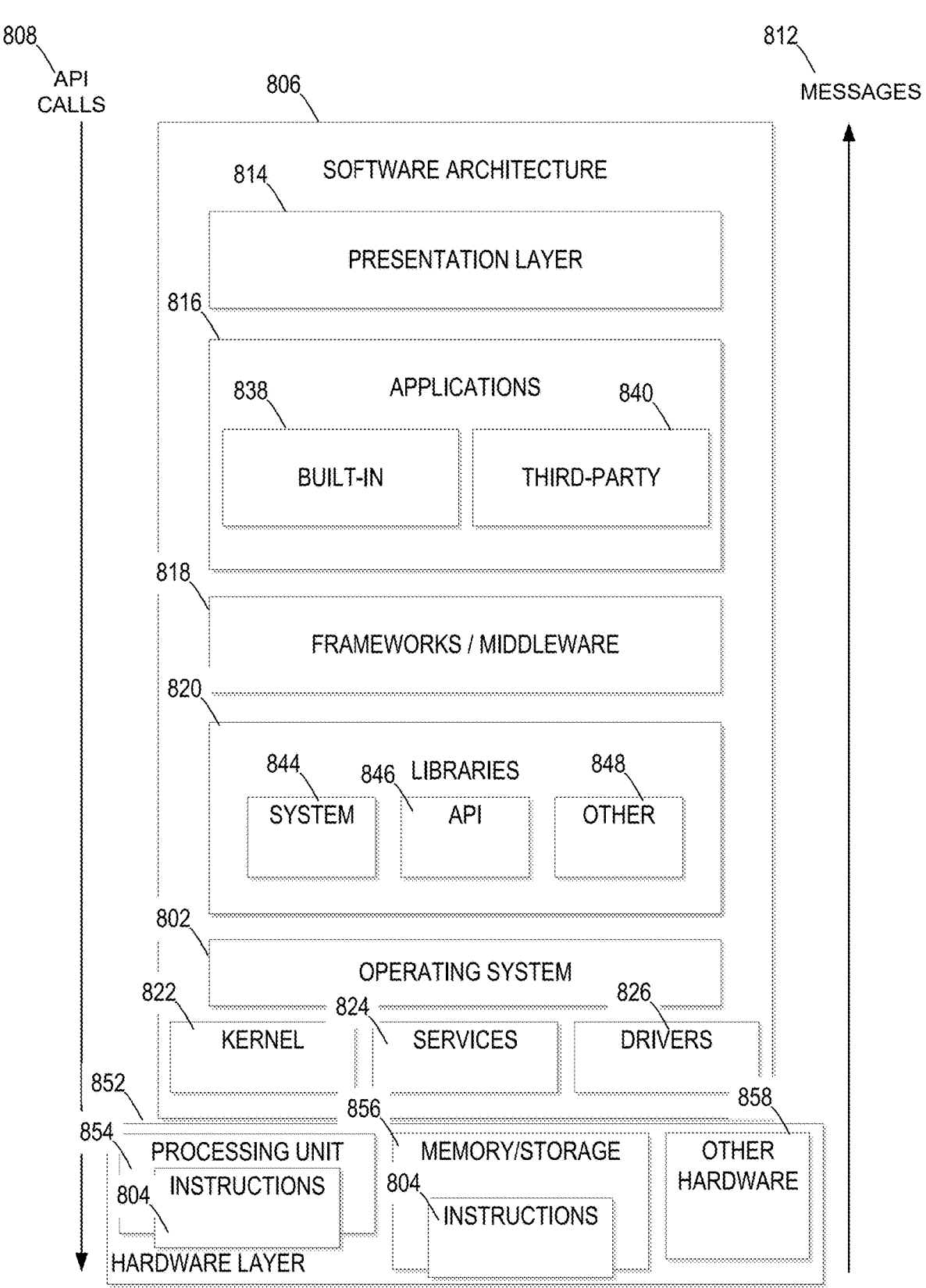
FIG. 8 is a block diagram illustrating an example software architecture, which may be used in conjunction with various hardware architectures herein described.

FIG. 8 is a block diagram illustrating an example software architecture 806, which may be used in conjunction with various hardware architectures herein described. FIG. 8 is a non-limiting example of a software architecture 806 and it will be appreciated that many other architectures may be implemented to facilitate the functionality described herein. The software architecture 806 may execute on hardware such as machine 900 of FIG. 9 that includes, among other things, processors 904, memory 914, and (input/output) I/O components 918. A representative hardware layer 852 is illustrated and can represent, for example, the machine 900 of FIG. 9. The representative hardware layer 852 includes a processing unit 854 having associated executable instructions 804. Executable instructions 804 represent the executable instructions of the software architecture 806, including implementation of the methods, components, and so forth described herein. The hardware layer 852 also includes memory and/or storage modules 856, which also have executable instructions 804. The hardware layer 852 may also comprise other hardware 858.

In the example architecture of FIG. 8, the software architecture 806 may be conceptualized as a stack of layers where each layer provides particular functionality. For example, the software architecture 806 may include layers such as an operating system 802, libraries 820, frameworks/middleware 818, applications 816, and a presentation layer 814. Operationally, the applications 816 and/or other components within the layers may invoke application programming interface (API) calls 808 through the software stack and receive a response such as messages 812 in response to the API calls 808. The layers illustrated are representative in nature and not all software architectures have all layers. For example, some mobile or special purpose operating systems may not provide a frameworks/middleware 818, while others may provide such a layer. Other software architectures may include additional or different layers.

The operating system 802 may manage hardware resources and provide common services. The operating system 802 may include, for example, a kernel 822, services 824, and drivers 826. The kernel 822 may act as an abstraction layer between the hardware and the other software layers. For example, the kernel 822 may be responsible for memory management, processor management (e.g., scheduling), component management, networking, security settings, and so on. The services 824 may provide other common services for the other software layers. The drivers 826 are responsible for controlling or interfacing with the underlying hardware. For instance, the drivers 826 include display drivers, camera drivers, Bluetooth® drivers, flash memory drivers, serial communication drivers (e.g., Universal Serial Bus (USB) drivers), Wi-Fi® drivers, audio drivers, power management drivers, and so forth, depending on the hardware configuration.

The libraries 820 provide a common infrastructure that is used by the applications 816 and/or other components and/or layers. The libraries 820 provide functionality that allows other software components to perform tasks in an easier fashion than to interface directly with the underlying operating system 802 functionality (e.g., kernel 822, services 824, and/or drivers 826). The libraries 820 may include system libraries 844 (e.g., C standard library) that may provide functions such as memory allocation functions, string manipulation functions, mathematical functions, and the like. In addition, the libraries 820 may include API libraries 846 such as media libraries (e.g., libraries to support presentation and manipulation of various media format such as MPEG4, H.264, MP3, AAC, AMR, JPG, PNG), graphics libraries (e.g., an OpenGL framework that may be used to render 2D and 3D in a graphic content on a display), database libraries (e.g., SQLite that may provide various relational database functions), web libraries (e.g., WebKit that may provide web browsing functionality), and the like. The libraries 820 may also include a wide variety of other libraries 848 to provide many other APIs to the applications 816 and other software components/modules.

The frameworks/middleware 818 (also sometimes referred to as middleware) provide a higher-level common infrastructure that may be used by the applications 816 and/or other software components/modules. For example, the frameworks/middleware 818 may provide various graphical user interface (GUI) functions, high-level resource management, high-level location services, and so forth. The frameworks/middleware 818 may provide a broad spectrum of other APIs that may be used by the applications 816 and/or other software components/modules, some of which may be specific to a particular operating system 802 or platform.

The applications 816 include built-in applications 838 and/or third-party applications 840. Examples of representative built-in applications 838 may include, but are not limited to, a contacts application, a browser application, a book reader application, a location application, a media application, a messaging application, and/or a game application. Third-party applications 840 may include an application developed using the ANDROID™ or IOS™ software development kit (SDK) by an entity other than the vendor of the particular platform, and may be mobile software running on a mobile operating system such as IOS™, ANDROID™, WINDOWS® Phone, or other mobile operating systems. The third-party applications 840 may invoke the API calls 808 provided by the mobile operating system (such as operating system 802) to facilitate functionality described herein.

The applications 816 may use built in operating system functions (e.g., kernel 822, services 824, and/or drivers 826), libraries 820, and frameworks/middleware 818 to create UIs to interact with users of the system. Alternatively, or additionally, in some systems, interactions with a user may occur through a presentation layer, such as presentation layer 814. In these systems, the application/component "logic" can be separated from the aspects of the application/component that interact with a user.

Figure 9:
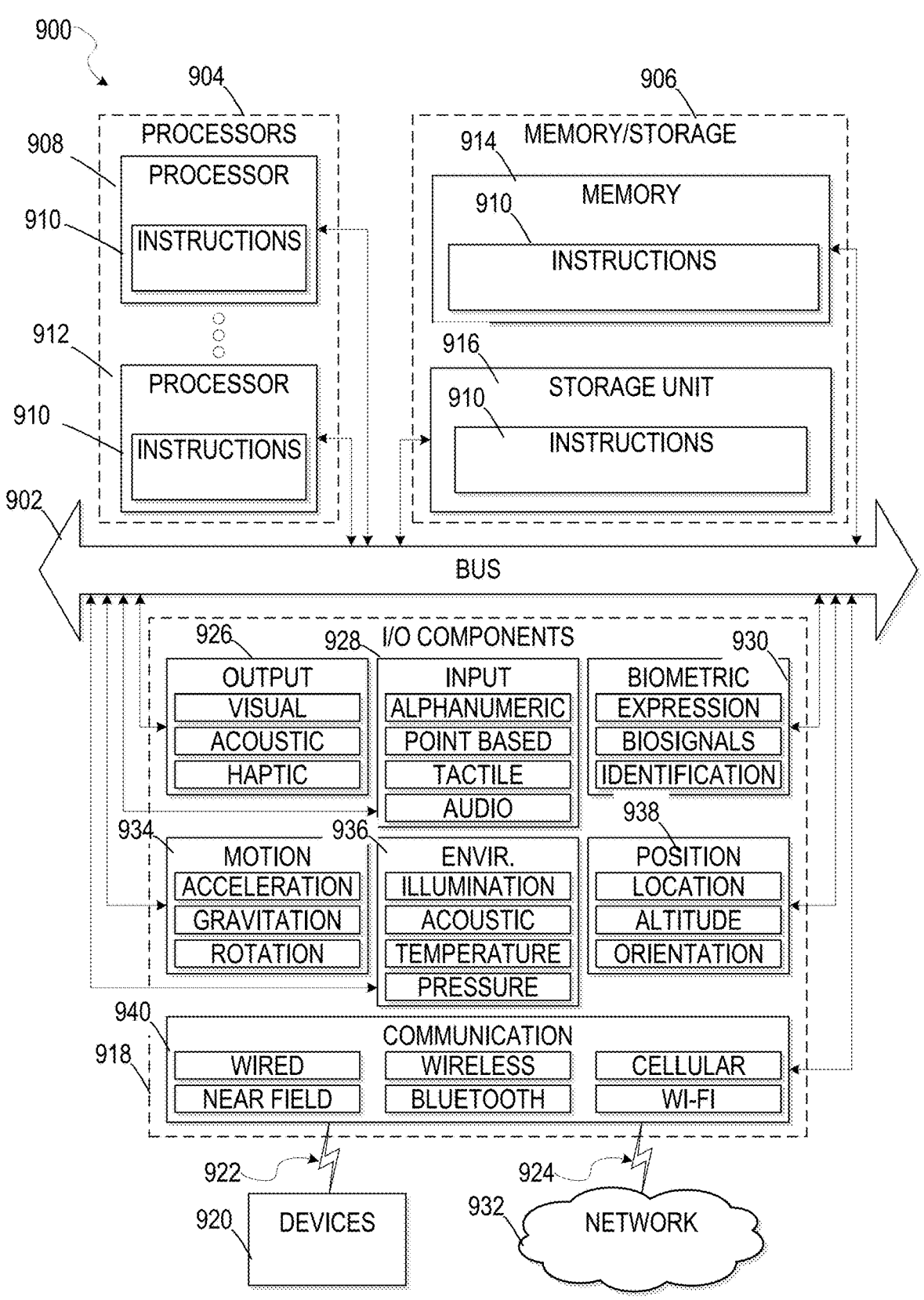
FIG. 9 is a block diagram illustrating components of a machine, according to some example embodiments, able to read instructions from a machine-readable medium (e.g., a machine-readable storage medium) and perform any one or more of the methodologies discussed herein.

FIG. 9 is a block diagram illustrating components of a machine 900, according to some example embodiments, able to read instructions from a machine-readable medium (e.g., a machine-readable storage medium) and perform any one or more of the methodologies discussed herein. Specifically, FIG. 9 shows a diagrammatic representation of the machine 900 in the example form of a computer system, within which instructions 910 (e.g., software, a program, an application, an applet, an app, or other executable code) for causing the machine 900 to perform any one or more of the methodologies discussed herein may be executed. As such, the instructions 910 may be used to implement modules or components described herein. The instructions 910 transform the general, non-programmed machine 900 into a particular machine 900 programmed to carry out the described and illustrated functions in the manner described. In alternative embodiments, the machine 900 operates as a standalone device or may be coupled (e.g., networked) to other machines. In a networked deployment, the machine 900 may operate in the capacity of a server machine or a client machine in a server-client network environment, or as a peer machine in a peer-to-peer (or distributed) network environment. The machine 900 may comprise, but not be limited to, a server computer, a client computer, a PC, a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine 900 capable of executing the instructions 910, sequentially or otherwise, that specify actions to be taken by machine 900. Further, while only a single machine 900 is illustrated, the term "machine" shall also be taken to include a collection of machines that individually or jointly execute the instructions 910 to perform any one or more of the methodologies discussed herein.

The machine 900 may include processors 904, memory/storage 906, and I/O components 918, which may be configured to communicate with each other such as via a bus 902. The memory/storage 906 may include a memory 914, such as a main memory, or other memory storage, and a storage unit 916, both accessible to the processors 904 such as via the bus 902. The storage unit 916 and memory 914 store the instructions 910 embodying any one or more of the methodologies or functions described herein. The instructions 910 may also reside, completely or partially, within the memory 914, within the storage unit 916, within at least one of the processors 904 (e.g., within the processor's cache memory), or any suitable combination thereof, during execution thereof by the machine 900. Accordingly, the memory 914, the storage unit 916, and the memory of processors 904 are examples of machine-readable media.

The I/O components 918 may include a wide variety of components to receive input, provide output, produce output, transmit information, exchange information, capture measurements, and so on. The specific I/O components 918 that are included in a particular machine 900 will depend on the type of machine. For example, portable machines such as mobile phones will likely include a touch input device or other such input mechanisms, while a headless server machine will likely not include such a touch input device. It will be appreciated that the I/O components 918 may include many other components that are not shown in FIG. 9. The I/O components 918 are grouped according to functionality merely for simplifying the following discussion and the grouping is in no way limiting. In various example embodiments, the I/O components 918 may include output components 926 and input components 928. The output components 926 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 928 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further example embodiments, the I/O components 918 may include biometric components 930, motion components 934, environmental components 936, or position components 938 among a wide array of other components. For example, the biometric components 930 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 934 may include acceleration sensor components (e.g., accelerometer), gravitation sensor components, rotation sensor components (e.g., gyroscope), and so forth. The environmental components 936 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 938 may include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 918 may include communication components 940 operable to couple the machine 900 to a network 932 or devices 920 via coupling 924 and coupling 922, respectively. For example, the communication components 940 may include a network interface component or other suitable device to interface with the network 932. In further examples, communication components 940 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 920 may be another machine or any of a wide variety of peripheral devices (e.g., a peripheral device coupled via a USB).

Moreover, the communication components 940 may detect identifiers or include components operable to detect identifiers. For example, the communication components 940 may include radio frequency identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 940 such as location via Internet Protocol (IP) geo-location, location via Wi-Fi® signal triangulation, location via detecting a NFC beacon signal that may indicate a particular location, and so forth.

GLOSSARY

"CARRIER SIGNAL" in this context refers to any intangible medium that is capable of storing, encoding, or carrying instructions 910 for execution by the machine 900, and includes digital or analog communications signals or other intangible medium to facilitate communication of such instructions 910. Instructions 910 may be transmitted or received over the network 932 using a transmission medium via a network interface device and using any one of a number of well-known transfer protocols.

"CLIENT DEVICE" in this context refers to any machine 900 that interfaces to a communications network 932 to obtain resources from one or more server systems or other client devices. A client device may be, but is not limited to, mobile phones, desktop computers, laptops, PDAs, smart phones, tablets, ultra books, netbooks, laptops, multi-processor systems, microprocessor-based or programmable consumer electronics, game consoles, STBs, or any other communication device that a user may use to access a network 932.

"COMMUNICATIONS NETWORK" in this context refers to one or more portions of a network 932 that may be an ad hoc network, an intranet, an extranet, a virtual private network (VPN), a LAN, a wireless LAN (WLAN), a WAN, a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network 932 or a portion of a network 932 may include a wireless or cellular network and the coupling may be a Code Division Multiple Access (CDMA) connection, a Global System for Mobile communications (GSM) connection, or other type of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

"MACHINE-READABLE MEDIUM" in this context refers to a component, device or other tangible media able to store instructions 910 and data temporarily or permanently and may include, but is not limited to, random-access memory (RAM), read-only memory (ROM), buffer memory, flash memory, optical media, magnetic media, cache memory, other types of storage (e.g., erasable programmable read-only memory (EEPROM)), and/or any suitable combination thereof. The term "machine-readable medium" should be taken to include a single medium or multiple media (e.g., a centralized or distributed database, or associated caches and servers) able to store instructions 910. The term "machine-readable medium" shall also be taken to include any medium, or combination of multiple media, that is capable of storing instructions 910 (e.g., code) for execution by a machine 900, such that the instructions 910, when executed by one or more processors 904 of the machine 900, cause the machine 900 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

"COMPONENT" in this context refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various example embodiments, one or more computer systems (e.g., a stand-alone computer system, a client computer system, or a server computer system) or one or more hardware components of a computer system (e.g., a processor or a group of processors 904) may be configured by software (e.g., an application 816 or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application specific integrated circuit (ASIC). A hardware component may also include programmable logic or circuitry that is temporarily configured by software to perform certain operations. For example, a hardware component may include software executed by a general-purpose processor 904 or other programmable processor 904. Once configured by such software, hardware components become specific machines 900 (or specific components of a machine 900) uniquely tailored to perform the configured functions and are no longer general-purpose processors 904. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor 904 configured by software to become a special-purpose processor, the general-purpose processor 904 may be configured as respectively different special-purpose processors (e.g., comprising different hardware components) at different times. Software accordingly configures a particular processor or processors 904, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses 902) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors 904 that are temporarily configured (e.g., by software) or permanently configured to perform the relevant operations. Whether temporarily or permanently configured, such processors 904 may constitute processor-implemented components that operate to perform one or more operations or functions described herein. As used herein, "processor-implemented component" refers to a hardware component implemented using one or more processors 904. Similarly, the methods described herein may be at least partially processor-implemented, with a particular processor or processors 904 being an example of hardware. For example, at least some of the operations of a method may be performed by one or more processors 904 or processor-implemented components. Moreover, the one or more processors 904 may also operate to support performance of the relevant operations in a "cloud computing" environment or as a "software as a service" (SaaS). For example, at least some of the operations may be performed by a group of computers (as examples of machines 900 including processors 904), with these operations being accessible via a network 932 (e.g., the Internet) and via one or more appropriate interfaces (e.g., an API). The performance of certain of the operations may be distributed among the processors 904, not only residing within a single machine 900, but deployed across a number of machines 900. In some example embodiments, the processors 904 or processor-implemented components may be located in a single geographic location (e.g., within a home environment, an office environment, or a server farm). In other example embodiments, the processors 904 or processor-implemented components may be distributed across a number of geographic locations.

"PROCESSOR" in this context refers to any circuit or virtual circuit (a physical circuit emulated by logic executing on an actual processor 904) that manipulates data values according to control signals (e.g., "commands," "op codes," "machine code," etc.) and which produces corresponding output signals that are applied to operate a machine 900. A processor 904 may be, for example, a central processing unit (CPU), a reduced instruction set computing (RISC) processor, a complex instruction set computing (CISC) processor, a graphics processing unit (GPU), a digital signal processor (DSP), an ASIC, a radio-frequency integrated circuit (RFIC) or any combination thereof. A processor 904 may further be a multi-core processor having two or more independent processors 904 (sometimes referred to as "cores") that may execute instructions 910 contemporaneously.

GLOSSARY

"CARRIER SIGNAL" in this context refers to any intangible medium that is capable of storing, encoding, or carrying instructions for execution by the machine, and includes digital or analog communications signals or other intangible medium to facilitate communication of such instructions. Instructions may be transmitted or received over the network using a transmission medium via a network interface device and using any one of a number of well-known transfer protocols.

"CLIENT DEVICE" in this context refers to any machine that interfaces to a communications network to obtain resources from one or more server systems or other client devices. A client device may be, but is not limited to, a mobile phone, desktop computer, laptop, portable digital assistants (PDAs), smart phones, tablets, ultra books, netbooks, laptops, multi-processor systems, microprocessor-based or programmable consumer electronics, game consoles, set-top boxes, or any other communication device that a user may use to access a network.

"COMMUNICATIONS NETWORK" in this context refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other type of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

"MACHINE-READABLE MEDIUM" in this context refers to a component, device or other tangible media able to store instructions and data temporarily or permanently and may include, but is not limited to, random-access memory (RAM), read-only memory (ROM), buffer memory, flash memory, optical media, magnetic media, cache memory, other types of storage (e.g., Erasable Programmable Read-Only Memory (EEPROM)) and/or any suitable combination thereof. The term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing instructions (e.g., code) for execution by a machine, such that the instructions, when executed by one or more processors of the machine, cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

"COMPONENT" in this context refers to a device, physical entity or logic having boundaries defined by function or subroutine calls, branch points, application program interfaces (APIs), or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a Field-Programmable Gate Array (FPGA) or an Application Specific Integrated Circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software) may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)). The performance of certain of the operations may be distributed among the processors, not only residing within a single machine, but deployed across a number of machines. In some example embodiments, the processors or processor-implemented components may be located in a single geographic location (e.g., within a home environment, an office environment, or a server farm). In other example embodiments, the processors or processor-implemented components may be distributed across a number of geographic locations.

"PROCESSOR" in this context refers to any circuit or virtual circuit (a physical circuit emulated by logic executing on an actual processor) that manipulates data values according to control signals (e.g., "commands", "op codes", "machine code", etc.) and which produces corresponding output signals that are applied to operate a machine. A processor may, for example, be a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC) or any combination thereof. A processor may further be a multi-core processor having two or more independent processors (sometimes referred to as "cores") that may execute instructions contemporaneously.

"TIMESTAMP" in this context refers to a sequence of characters or encoded information identifying when a certain event occurred, for example giving date and time of day, sometimes accurate to a small fraction of a second.

"TIME DELAYED NEURAL NETWORK (TDNN)" in this context refers to an artificial neural network architecture whose primary purpose is to work on sequential data. An example would be converting continuous audio into a stream of classified phoneme labels for speech recognition.

"BI-DIRECTIONAL LONG-SHORT TERM MEMORY (BLSTM)" in this context refers to a recurrent neural network (RNN) architecture that remembers values over arbitrary intervals. Stored values are not modified as learning proceeds. RNNs allow forward and backward connections between neurons. BLSTMs are well-suited for the classification, processing, and prediction of time series, given time lags of unknown size and duration between events.

What is claimed is:

1. A method comprising:

accessing a route tracking report associated with a vehicle to identify a plurality of routes associated with the vehicle;

generating, for display, a graphical user interface (GUI) for navigating through the plurality of routes associated with the vehicle;

presenting, in the GUI, a first option for accessing current routes and a second option for accessing future routes;

in response to receiving a selection of the first option for accessing the current routes, present, in the GUI, a list of categories associated with routes scheduled for completion on a current date and routes that have been completed on the current date, wherein a first list of routes includes only routes that are currently active on the current date is presented in response to receiving a user selection of a first category of the list of categories associated with routes scheduled for completion, and wherein a second list of routes including only routes that have been completed on the current date is presented in response to receiving a user selection of a second category of the list of categories associated with the routes that have been completed on the current date;

detecting input that selects the second option to access the future routes comprising a plurality of routes associated with the vehicle;

in response to receiving the input that selects the second option to access the future routes, presenting, in the GUI, a selectable time period range comprising a list of dates on which routes are scheduled for completion, the selectable time period range enabling selection of a subset of future routes separately from selection of the second option for accessing the future routes;

in response to detecting the input that selects the second option to access the future routes, determining that a first future route of the plurality of routes is associated with a status to review; and in response to detecting the input that selects the second option to access the future routes, presenting simultaneously a first cell comprising a first identifier of a first route and a second cell comprising a second identifier of a second future route of the plurality of routes, the first cell presenting a first plurality of stops associated with the first future route, the second cell presenting a second plurality of stops associated with the second future route, the first plurality of stops being presented simultaneously with the second plurality of stops respectively in the first cell and the second cell, a first visual textual indicator being presented in the first cell to notify a driver about a first change associated with assignment of the plurality of routes, the first visual textual indicator comprising a first set of one or more words representing the first change, a second visual textual indicator being presented, simultaneously with the first visual textual indicator that is presented in the first cell, in the second cell to notify the driver about a second change associated with assignment of the plurality of routes, the second visual textual indicator comprising a second set of one or more words representing the second change.

2. The method of claim 1, the graphical user interface comprising a plurality of time period options, comprising:
receiving input that selects a first time period option from the plurality of time period options;
in response to receiving the input, retrieving a first set of routes from the plurality of routes that corresponds to the first time period option, the first set of routes comprising the first future route having a first scheduled start time and a first scheduled end time and the second future route having a second scheduled start time and a second scheduled end time; and
updating the GUI to display, at a first point in time, a first portion of the first set of routes in response to receiving the input, the first portion displayed in the GUI comprising the first cell comprising the first identifier of the first route and the first scheduled start time and the first scheduled end time and the second cell comprising the second identifier of the second route and the second scheduled start time and the second scheduled end time, wherein the first cell and the second cell are different cells.

3. The method of claim 2, wherein the plurality of time period options comprises a first option for accessing past routes, a second option for accessing current routes, and a third option for accessing future routes.

4. The method of claim 1, further comprising:
determining that a first time period option represents routes that have been performed in the past relative to a current date;
setting a past time period range comprising a starting date corresponding to a past date that precedes the current date by a threshold number of days and comprising an ending date corresponding to one day previous to the current date; and
searching the plurality of routes for a first set of routes associated with the past time period range.

5. The method of claim 1, wherein the first change corresponds to a new route being added to the plurality of routes and the first set of one or more words comprising the word "new," and wherein the second change corresponds to an existing route having changes and the first set of one or more words comprising the word "updated".

6. The method of claim 1, the first identifier and the second identifier being displayed in reverse chronological order.

7. The method of claim 6, wherein the first identifier includes a description of the first future route and a completion status.

8. The method of claim 1, wherein the first identifier indicates a quantity of stops of the first route that have been skipped.

9. The method of claim 1, wherein the GUI displays a past time period range.

10. The method of claim 1, further comprising:
applying a machine learning model to past route information;
in response to applying the machine learning model to the past route information, predicting one or more routes that are associated with billing or account errors;
determining that the first route is included among the one or more routes; and
in response to determining that the first route is included among the one or more routes, visually distinguishing the first identifier of the first future route from the second identifier of the second future route.

11. The method of claim 1, further comprising:
receiving a request to access additional portions of the plurality of routes; and
in response to receiving the request, updating the GUI to display a second portion of the plurality of routes.

12. The method of claim 1, further comprising:
determining that a first time period option represents routes that are assigned to be completed in the future relative to a current date;
setting a future time period range comprising a starting date corresponding to one day following the current date and an ending date corresponding to a date that follows the current date by a threshold number of days; and
searching the plurality of routes for a first set of routes associated with the future time period range.

13. The method of claim 12, wherein the first set of routes are assigned to be completed within the future time period range.

14. The method of claim 1, wherein the first route is assigned to be completed within a future time period range and the second route is assigned to be completed within the future time period range, the first identifier and the second identifier being displayed in chronological order.

15. The method of claim 1, wherein the first route of the plurality of routes comprises a first plurality of stops traversed during a time period between a first scheduled start time and a first scheduled end time.

16. The method of claim 1, wherein the first set of one or more words representing the first change corresponding to the first future route including the word new.

17. The method of claim 16, wherein the word new is displayed in response to determining that the first route is displayed for a first time to an operator associated with the vehicle.

18. The method of claim 1, further comprising:
determining that a first time period option represents routes that are assigned to be completed on a current date; and
searching the plurality of routes for a first set of routes associated with the current date, the second identifier indicating an overdue status in response to determining that a current time is past a scheduled start time of the second route.

19. A system comprising:
one or more computer processors; and
one or more computer-readable mediums storing instructions that, when executed by the one or more computer processors, cause the system to perform operations comprising:
accessing a route tracking report associated with a vehicle to identify a plurality of routes associated with the vehicle;
generating, for display, a graphical user interface (GUI) for navigating through the plurality of routes associated with the vehicle;
presenting, in the GUI, a first option for accessing current routes and a second option for accessing future routes;
in response to receiving a selection of the first option for accessing the current routes, present, in the GUI, a list of categories associated with routes scheduled for completion on a current date and routes that have been completed on the current date, wherein a first list of routes includes only routes that are currently active on the current date is presented in response to receiving a user selection of a first category of the list of categories associated with routes scheduled for completion, and wherein a second list of routes including only routes that have been completed on the current date is presented in response to receiving a user selection of a second category of the list of categories associated with the routes that have been completed on the current date;

detecting input that selects the second option to access the future routes comprising a plurality of routes associated with the vehicle;

in response to receiving the input that selects the second option to access the future routes, presenting, in the GUI, a selectable time period range comprising a list of dates on which routes are scheduled for completion, the selectable time period range enabling selection of a subset of future routes separately from selection of the second option for accessing the future routes;

in response to detecting the input that selects the second option to access the future routes, determining that a first future route of the plurality of routes is associated with a status to review; and in response to detecting the input that selects the second option to access the future routes, presenting simultaneously a first cell comprising a first identifier of a first route and a second cell comprising a second identifier of a second future route of the plurality of routes, the first cell presenting a first plurality of stops associated with the first future route, the second cell presenting a second plurality of stops associated with the second future route, the first plurality of stops being presented simultaneously with the second plurality of stops respectively in the first cell and the second cell, a first visual textual indicator being presented in the first cell to notify a driver about a first change associated with assignment of the plurality of routes, the first visual textual indicator comprising a first set of one or more words representing the first change, a second visual textual indicator being presented, simultaneously with the first visual textual indicator that is presented in the first cell, in the second cell to notify the driver about a second change associated with assignment of the plurality of routes, the second visual textual indicator comprising a second set of one or more words representing the second change.

20. A non-transitory computer-readable medium storing instructions that, when executed by one or more computer processors of a system, cause the system to perform operations comprising:

accessing a route tracking report associated with a vehicle to identify a plurality of routes associated with the vehicle;

generating, for display, a graphical user interface (GUI) for navigating through the plurality of routes associated with the vehicle;

presenting, in the GUI, a first option for accessing current routes and a second option for accessing future routes;

in response to receiving a selection of the first option for accessing the current routes, present, in the GUI, a list of categories associated with routes scheduled for completion on a current date and routes that have been completed on the current date, wherein a first list of routes includes only routes that are currently active on the current date is presented in response to receiving a user selection of a first category of the list of categories associated with routes scheduled for completion, and wherein a second list of routes including only routes that have been completed on the current date is presented in response to receiving a user selection of a second category of the list of categories associated with the routes that have been completed on the current date;

detecting input that selects the second option to access the future routes comprising a plurality of routes associated with the vehicle;

in response to receiving the input that selects the second option to access the future routes, presenting, in the GUI, a selectable time period range comprising a list of dates on which routes are scheduled for completion, the selectable time period range enabling selection of a subset of future routes separately from selection of the second option for accessing the future routes;

in response to detecting the input that selects the second option to access the future routes, determining that a first future route of the plurality of routes is associated with a status to review; and in response to detecting the input that selects the second option to access the future routes, presenting simultaneously a first cell comprising a first identifier of a first route and a second cell comprising a second identifier of a second future route of the plurality of routes, the first cell presenting a first plurality of stops associated with the first future route, the second cell presenting a second plurality of stops associated with the second future route, the first plurality of stops being presented simultaneously with the second plurality of stops respectively in the first cell and the second cell, a first visual textual indicator being presented in the first cell to notify a driver about a first change associated with assignment of the plurality of routes, the first visual textual indicator comprising a first set of one or more words representing the first change, a second visual textual indicator being presented, simultaneously with the first visual textual indicator that is presented in the first cell, in the second cell to notify the driver about a second change associated with assignment of the plurality of routes, the second visual textual indicator comprising a second set of one or more words representing the second change.

* * * * *